United States Patent
Su et al.

(10) Patent No.: US 8,318,889 B2
(45) Date of Patent: *Nov. 27, 2012

(54) ORGANIC POLYURETHANE SHAPE MEMORY MATERIAL AND A PREPARATION METHOD THEREOF

(75) Inventors: Wen-Chiung Su, Taipei (TW); Cheng-Che Tsai, Douliou (TW); Ching-Shiang Yu, Dali (TW); Shenghong A Dai, Taichung (TW); Ru-Jong Jeng, Taichung (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 787 days.

This patent is subject to a terminal disclaimer.

(21) Appl. No.: 11/889,867

(22) Filed: Aug. 17, 2007

(65) Prior Publication Data

US 2009/0048418 A1 Feb. 19, 2009

(51) Int. Cl.
*C08G 18/00* (2006.01)

(52) U.S. Cl. ............... 528/78; 528/53; 528/59; 528/65; 528/85

(58) Field of Classification Search ............ 528/49, 528/60, 65, 53, 59, 78, 85
See application file for complete search history.

(56) References Cited

U.S. PATENT DOCUMENTS

| 4,576,747 A * | 3/1986 | Dai ........................ 540/356 |
| 2005/0107563 A1* | 5/2005 | Hu et al. .................. 528/44 |
| 2007/0088135 A1* | 4/2007 | Lendlein et al. ........... 525/444 |

* cited by examiner

*Primary Examiner* — Michael L Leonard
(74) *Attorney, Agent, or Firm* — Rosenberg, Klein & Lee

(57) ABSTRACT

An organic polyurethane shape memory material includes a C10 chain or C18 chain and consists of hard segment and soft segment. The material is produced by reacting the single-chain type dendrimer with diethylenetriamine to produce dendrimer. Then dendrimer reacts with N-(3-aminopropyl) diethanolamine to produce dendritic diols. Next, polymer $HO(C_6H_{10}O_2)xC_2H_4OC_2H_4(C_6H_{10}O_2)_yOH$, where x+y=25~26, reacts with methylenedi-p-phenyl diisocyanate, and at least one type of dendritic diols is added to produce the organic polyurethane shape memory material.

1 Claim, 26 Drawing Sheets

ORGANIC POLYURETHANE SHAPE MEMORY MATERIAL AND A PREPARATION METHOD THEREOF

BACKGROUND OF THE INVENTION

The present invention relates to a shape memory organic material and a preparation method thereof, especially to an organic polyurethane shape memory material and a preparation method thereof that are applied to materials with shape recovery property.

Smart material is a novel functional function that senses external stimuli. Self-judges and take actions and such material has been studied extensively with great application potential. They may be used in daily lives, information technology and even national defense industry. Generally, smart materials have following features:
(1) sensitivity: sensitive to strength and change of environmental stimuli such as load, stress, strain, vibration, light, heat, electricity, magnetism, chemical or nuclear radiation.
(2) response ability: according to environmental and internal changes, dynamically have a response.
(3) self-adjustment and repair: repair partial damages or destruction through adaptive or regeneration mechanism.

The most common smart material is shape-memory material that is divided into three categories.
(1) Metal Alloy:
In 1963, Buechler etc. described Shape-memory feature of the nickel-titanium alloy by phase transition of materials under different temperature. Due to its biocompatibility, such material is extensively applied to surgery device and implant.
(2) Ceramic:
Wei etc. disclosed ceramic material such as ZrO2. Like metal alloy, the ceramic material is applied with temperature variations or stress so as to make material structure phase transition occur.
(3) Polymer:
There are classified into two types chemical cross-linking and physical cross-linking. Earlier in 1960, Polyethylene (PE) molecules are joined by covalent cross-linking so as to be heat shrink tubing for covering wires. The deformation is triggered by melting temperature of the PE while covalent cross-linking fixes the deformation. As to poly(vinyl chloride) (PVC), high cross-linking is obtained by heating and the material is also shape-memory material. In physical cross-linking system such as gel, the volume and swelling of polymer are changed by PH vale, dissolvent and sensitivity to ionic strength. But it's main shortcoming is poor mechanical strength.

However, metal and ceramic material both have disadvantages of high cost, poor processability and difficulty in modification. As to the polymer gel system, the mechanical strength is poor. Thus there is a need to provide a new organic polyurethane shape memory material that has advantages of low cost, good processability and easy modification. Moreover, the mechanical strength is also improved.

SUMMARY OF THE INVENTION

Therefore it is a primary object of the present invention to provide an organic polyurethane shape memory material and a preparation method thereof that avoid poor processability of metal alloy and ceramic material.

It is another object of the present invention to provide an organic polyurethane shape memory material and a preparation method thereof that improve difficulty in modification of metal alloy and ceramic material.

It is a further object of the present invention to provide an organic polyurethane shape memory material and a preparation method thereof that overcome shortcoming of high manufacturing cost of metal alloy and ceramic material.

It is a further object of the present invention to provide an organic polyurethane shape memory material and a preparation method thereof that avoid poor mechanical strength of polymer gel system.

In order to achieve objects, the organic polyurethane shape memory material according to the present invention includes:

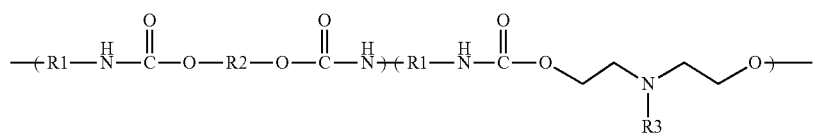

Wherein R1 is $(C_{13}H_{10})$
R2 is $(C_5H_{10}COO)_xC_2H_4OC_2H_4(OOCC_5H_{10})_y$, where $x+y=25\sim26$; and
R3 is selected from one of the followings:

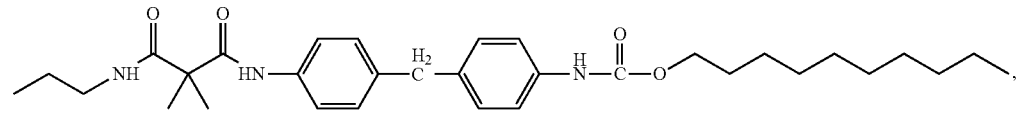

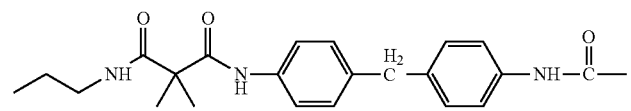

-continued
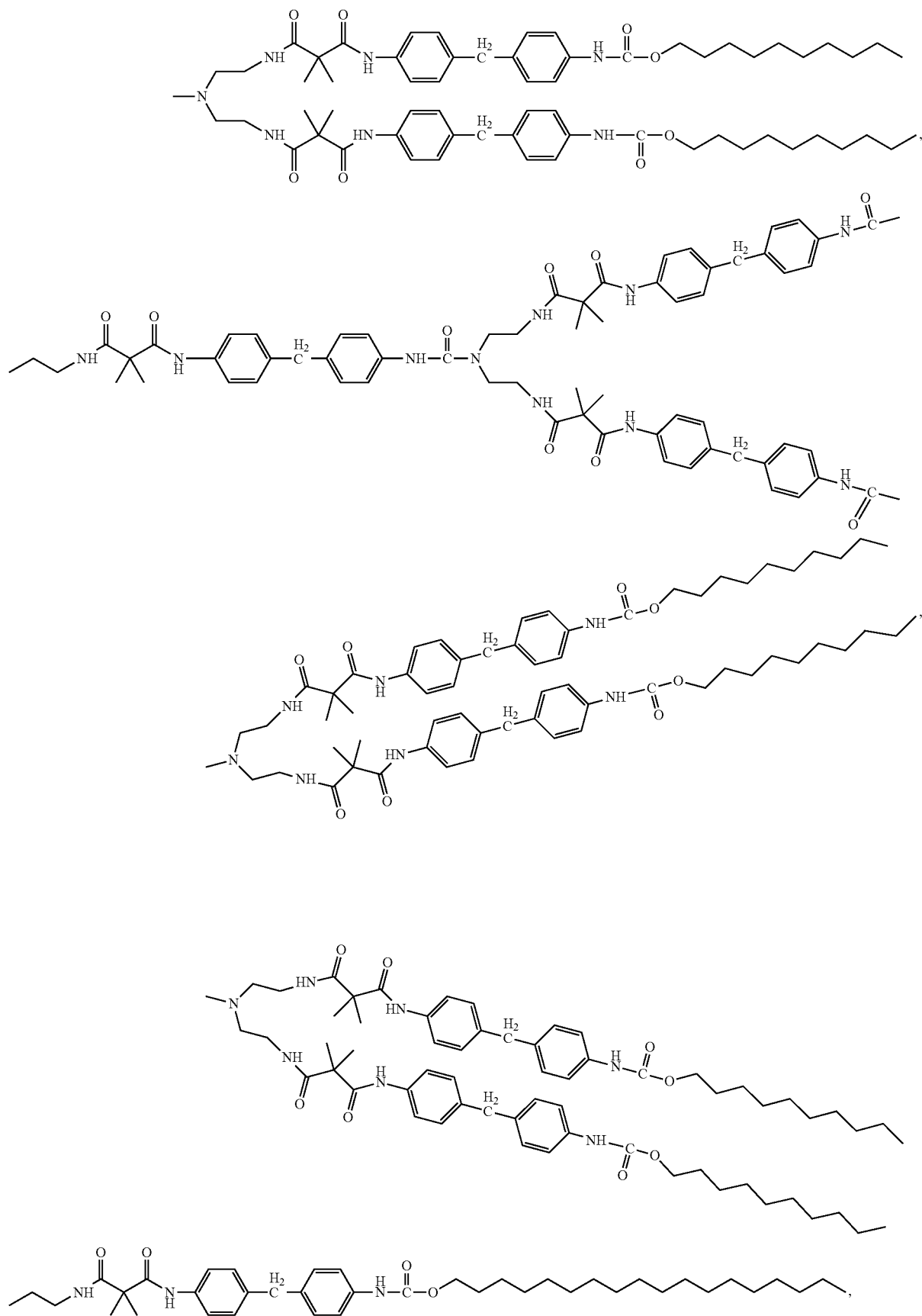

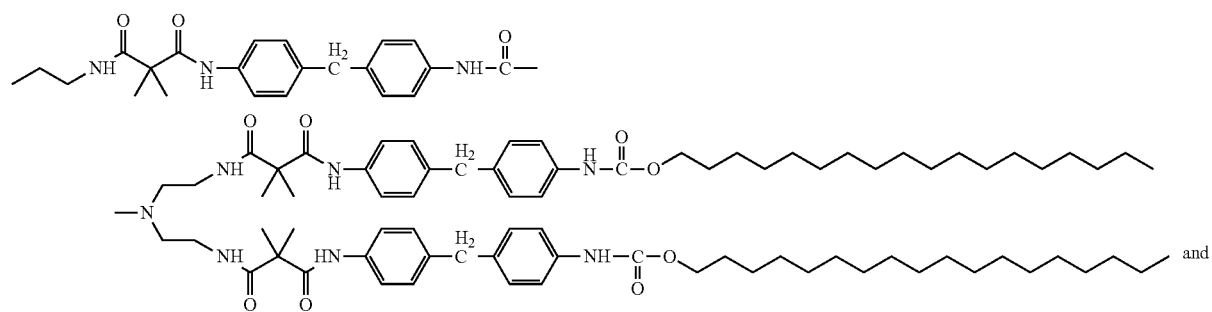
-continued
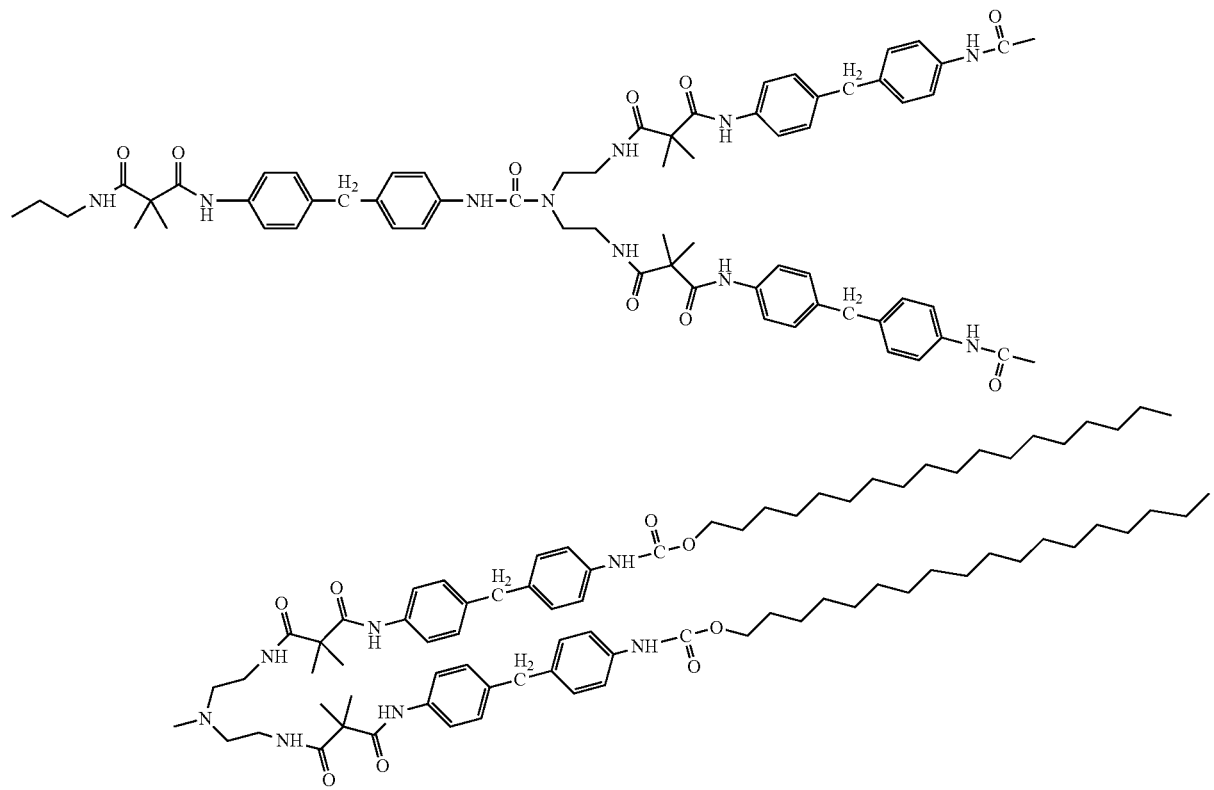
and
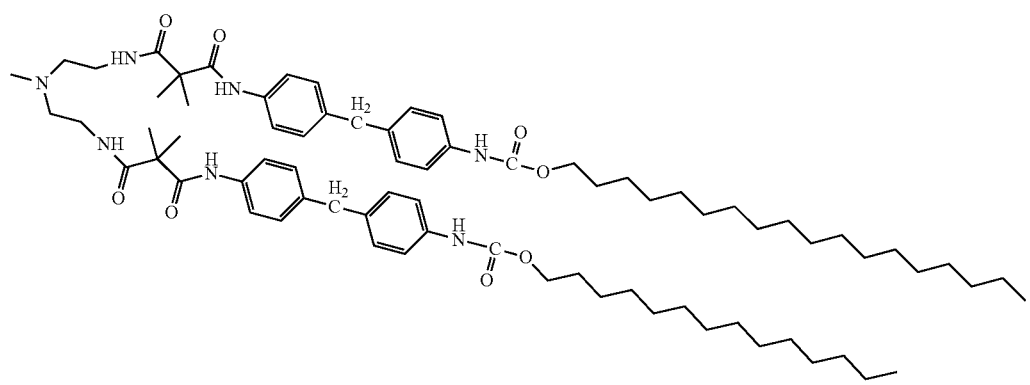

A preparation method of the organic polyurethane shape memory material is composed of following steps: dissolve methylenedi-p-phenyl diisocyanate and isobutyryl chloride in xylene, reacting with each other to get a first solution. Filter the first solution and the filtrate is purified by recrystallization to produce 4-isocyanate-4-(3,3-dimethyl-2,4-dioxo-azetidine)diphenyl methane (MIA). The 4-isocyanate-4-(3,3-dimethyl-2,4-dioxo-azetidine)diphenyl methane reacts with primary alcohol to produce dendrimer with single chain structure while the primary alcohol is selected from a group of decyl alcohol and stearyl alcohol and the dendrimer is single-chain type dendrimer having a decyl group or single-chain type dendrimer having an octadecyl group. The single-chain type dendrimer reacts with diethylenetriamine to produce multiple chains type dendrimer that is multiple chains type dendrimer having a decyl group or multiple chains type dendrimer having an octadecyl group. At least one type dendrimer reacts with N-(3-aminopropyl)diethanolamine to produce at least one type dendritic diols that is dendritic diols having a decyl group or dendritic diols having an octadecyl group. Polymer $HO(C_6H_{10}O_2)_xC_2H_4OC_2H_4(C_6H_{10}O_2)_yOH$, $x+y=25\sim26$ reacts with methylenedi-p-phenyl diisocyanate (MDI) and then at least one type dendritic diols is added to react so as to get organic polyurethane shape memory material.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to achieve objects, the organic polyurethane shape memory material according to the present invention includes:

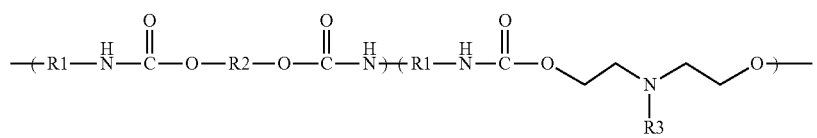

Wherein R1 is (C₁₃H₁₀)
R2 is (C₅H₁₀COO)ₓC₂H₄OC₂H₄(OOCC₅H₁₀)ᵧ,
where x+y=25~26; and
R3 is selected from one of the followings:
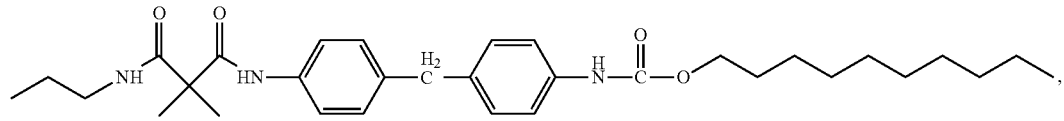
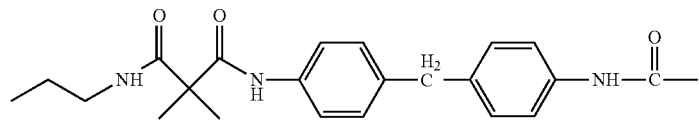
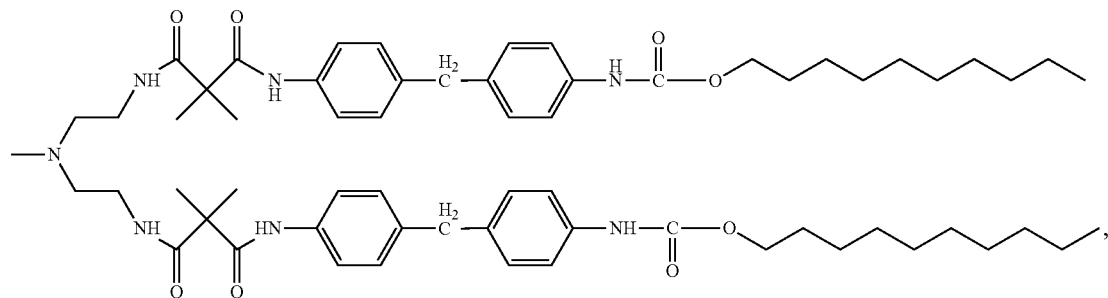
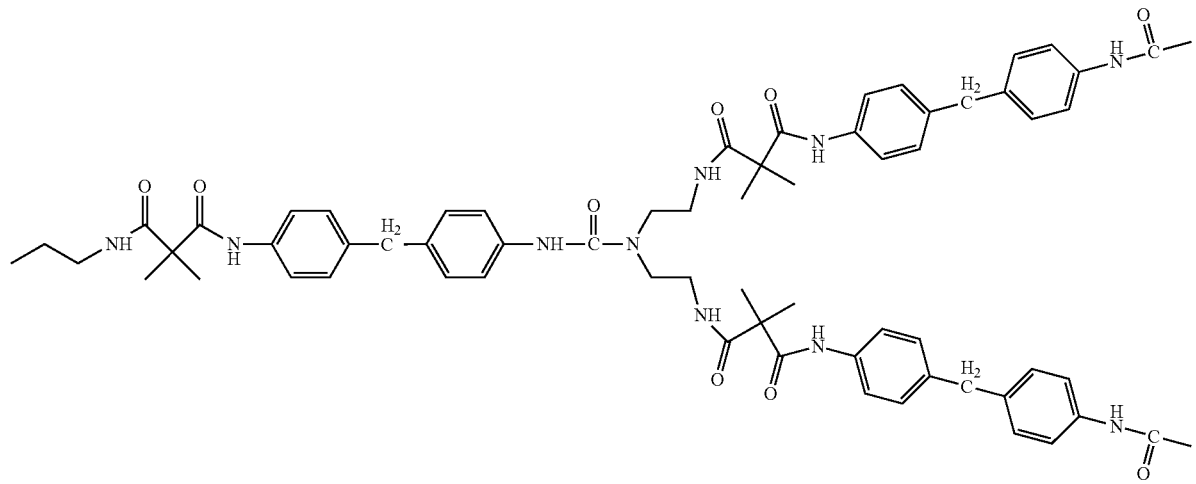

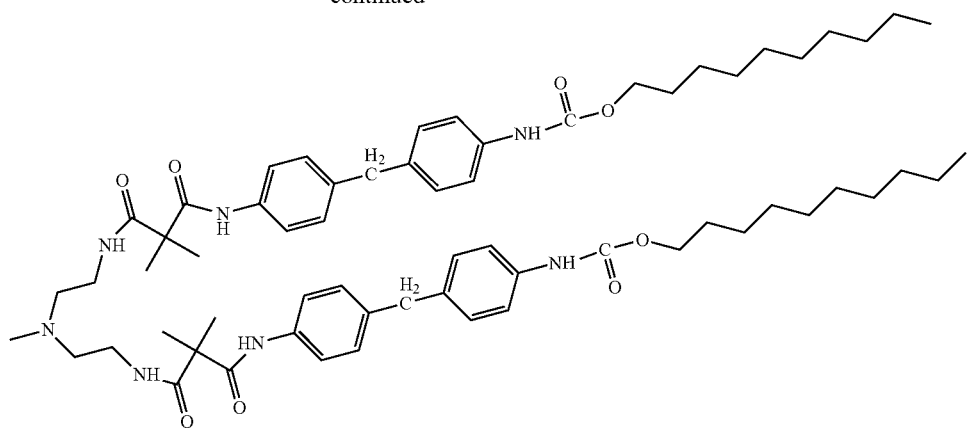
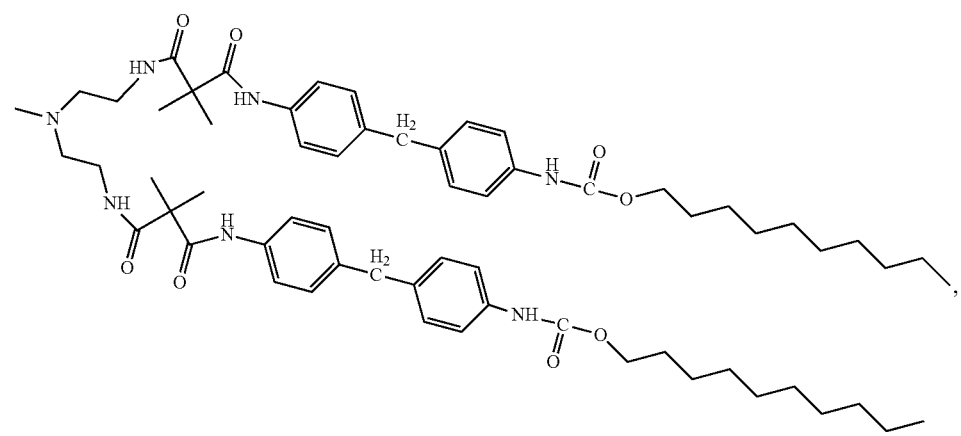
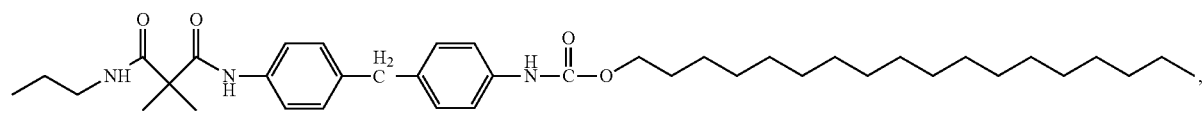
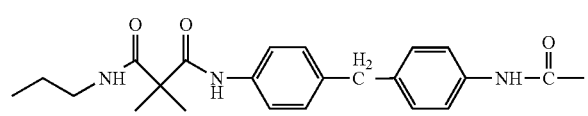
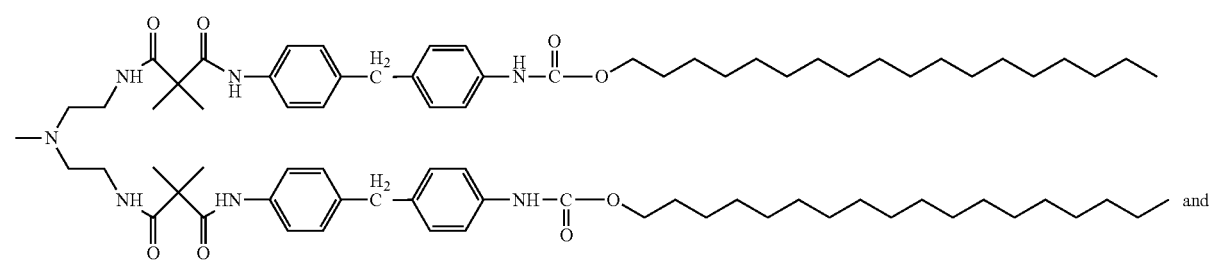

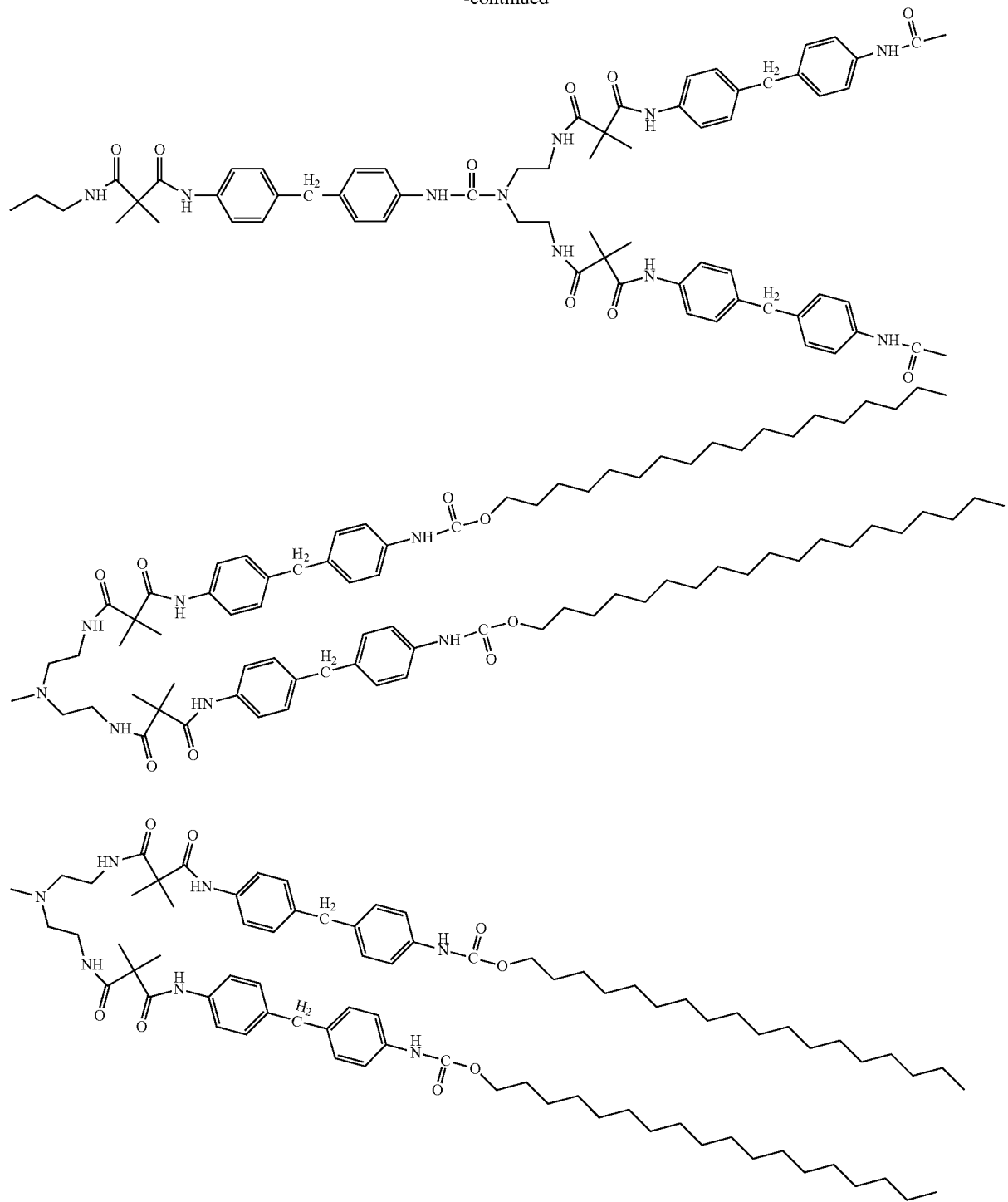

-continued

Figure 1:
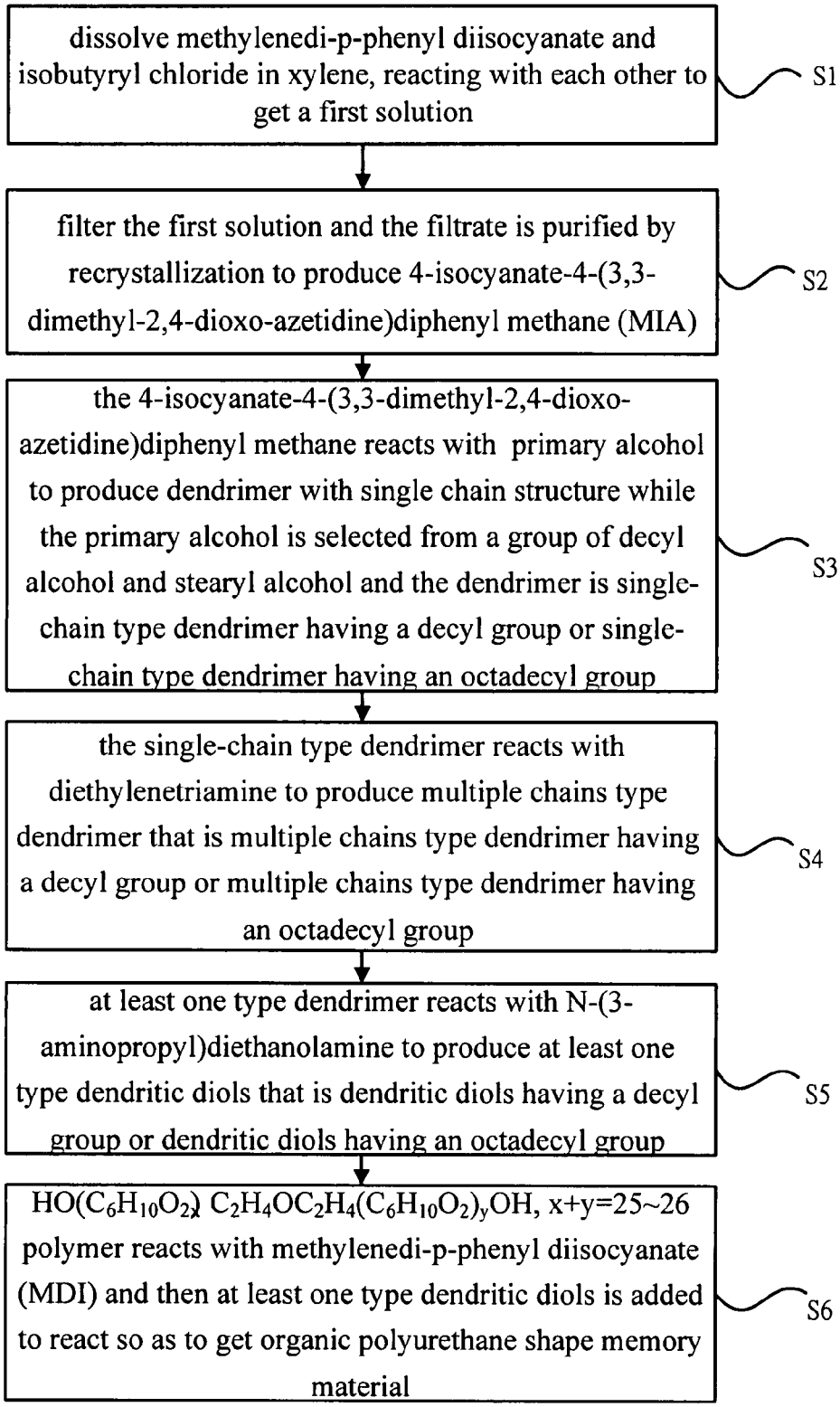
FIG. 1 is a flow chart showing a preparation method of an organic polyurethane shape memory material according to the present invention.

A preparation method of the organic polyurethane shape memory material consists of following steps, as shown in FIG. 1:

S1 dissolve methylenedi-p-phenyl diisocyanate and isobutyryl chloride in xylene, reacting with each other to get a first solution;

S2 filter the first solution and the filtrate is purified by recrystallization to produce 4-isocyanate-4-(3,3-dimethyl-2,4-dioxo-azetidine)diphenyl methane (MIA);

S3 the 4-isocyanate-4-(3,3-dimethyl-2,4-dioxo-azetidine) diphenyl methane reacts with primary alcohol to produce dendrimer with single chain structure while the primary alcohol is selected from a group of decyl alcohol and stearyl alcohol and the dendrimer is single-chain type dendrimer having a decyl group or single-chain type dendrimer having an octadecyl group;

S4 the single-chain type dendrimer reacts with diethylenetriamine to produce multiple chains type dendrimer that is multiple chains type dendrimer having a decyl group or multiple chains type dendrimer having an octadecyl group;

S5 at least one type dendrimer reacts with N-(3-aminopropyl)diethanolamine to produce at least one type dendritic diols that is dendritic diols having a decyl group or dendritic diols having an octadecyl group; and S6 $HO(C_6H_{10}O_2)_xC_2H_4OC_2H_4(C_6H_{10}O_2)_yOH$, x+y=25~26 polymer reacts with methylenedi-p-phenyl diisocyanate (MDI) and then at least one type dendritic diols is added to react so as to get organic polyurethane shape memory material.

In the step S1, triethylamine is used to catalyze the reaction of generating the first solution by dissolving the methylenedi-p-phenyl diisocyanate and the isobutyryl chloride in xylene. The reaction temperature of step S1 ranges from 110~130° C. and 120° C. is preferable. In the step S2, cyclohexane is used in recrystallization and purification of the filtrate. The step S3 further includes a step of dissolving 4-isocyanate-4-(3,3-dimethyl-2,4-dioxo-azetidine)diphenyl methane in tetrahydrofuran while the reaction time of the step S3 is from 3 to 5 hours (4 hours is preferable) the reaction temperature is 70~90° C. and 80° C. is preferred. In the step S4, the dendrimer and diethylenetriamine react in tetrahydrofuran under temperature ranging from 50~70° C. while 60° C. is preferred After the step S4, a further step is to react the multiple chains type dendrimer with 4-isocyanate-4-(3,3-dimethyl-2,4-dioxo-azetidine)diphenyl methane to produce another multiple chains type dendrimer. The reaction time of the step S5 is 3 to 5 hours while 4 hours is preferable and the reaction temperature is 70~90° C., 80° C. is preferred. In the step S6, the polymer $HO(C_6H_{10}O_2)_xC_2H_4OC_2H_4(C_6H_{10}O_2)_yOH$, x+y=25~26 is dissolved in the toluene at temperature of 60~70° C. The polymer reacts with methylenedi-p-phenyl diisocyanate for 0.5 hour and then adding dendritic diol, continuingly reacting for 3-4 hours.

An Embodiment (1) Synthesis of 4-isocyanate-4-(3,3-dimethyl-2,4-dioxo-azetidine)diphenyl methane (MIA)

Figure 2:
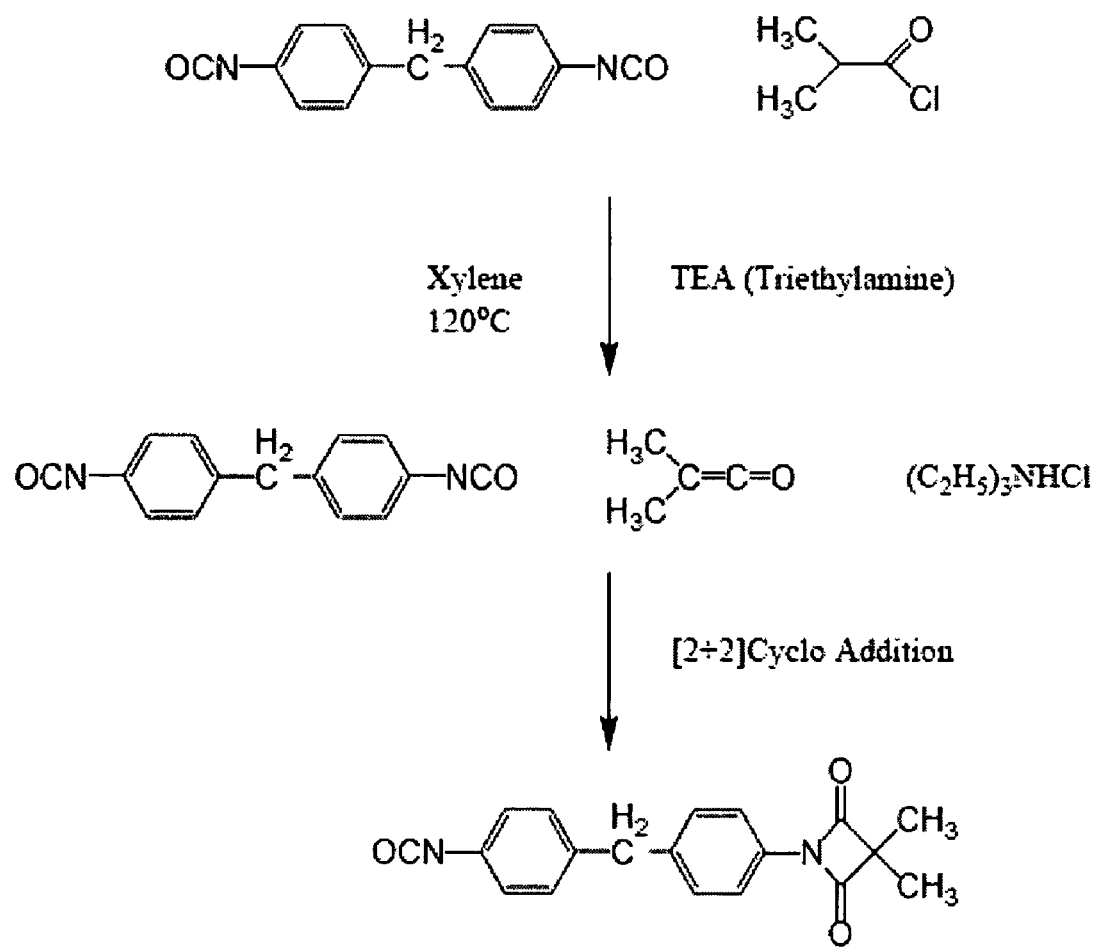
FIG. 2 is a schematic drawing showing synthesis of 4-isocyanate-4-(3,3-dimethyl-2,4-dioxo-azetidine)diphenyl methane according to the present invention.

Dissolve the methylenedi-p-phenyl diisocyanate (MDI) and the isobutyryl chloride in the xylene while equivalence ratio of MDI/isobutyryl chloride is 1:0.7. Heat the solution up to 120° C., add triethylamine as catalyst, stir the solution for 3-4 hours. The solution is cooled to 0° and the first solution (orange liquid) is produced. After filtering, the filtrate is purified and recrystallized by cyclohexane to get MIA. The flow chart of the reaction is shown in FIG. 2.

(2) Synthesis of Various Endrimer

Figure 3:
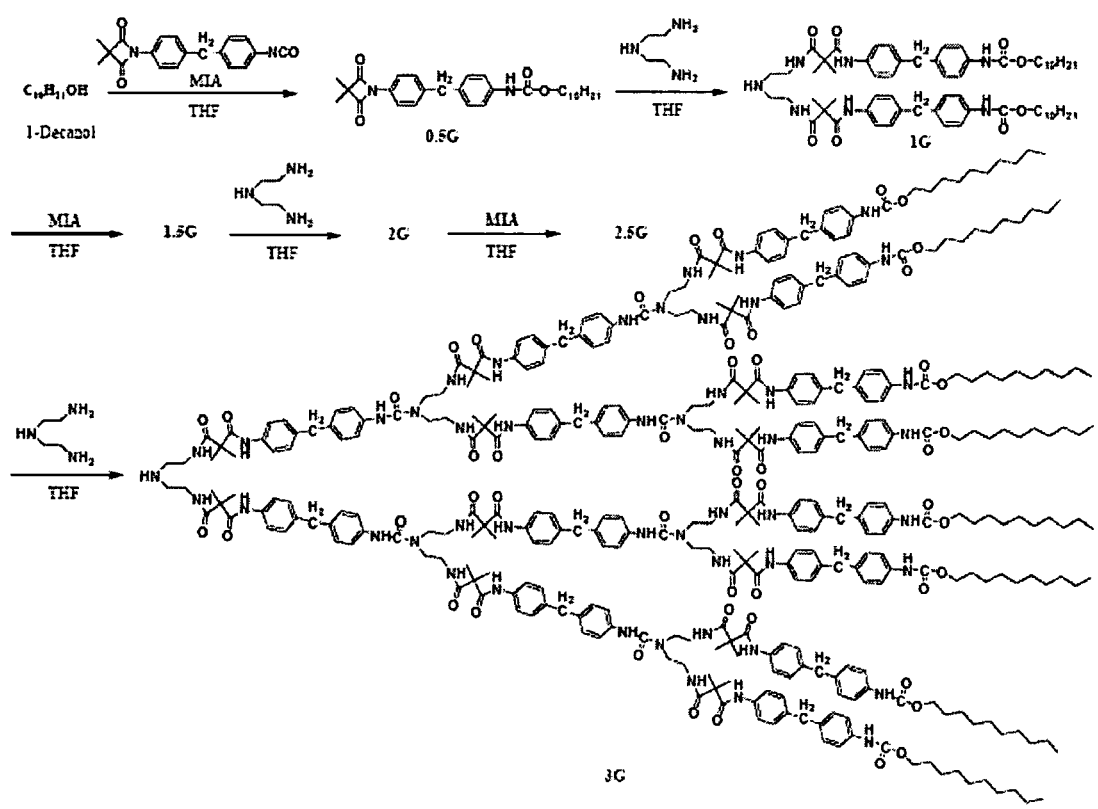
FIG. 3 is a schematic drawing showing synthesis of dendrimer with C10 chain according to the present invention.
Figure 4:
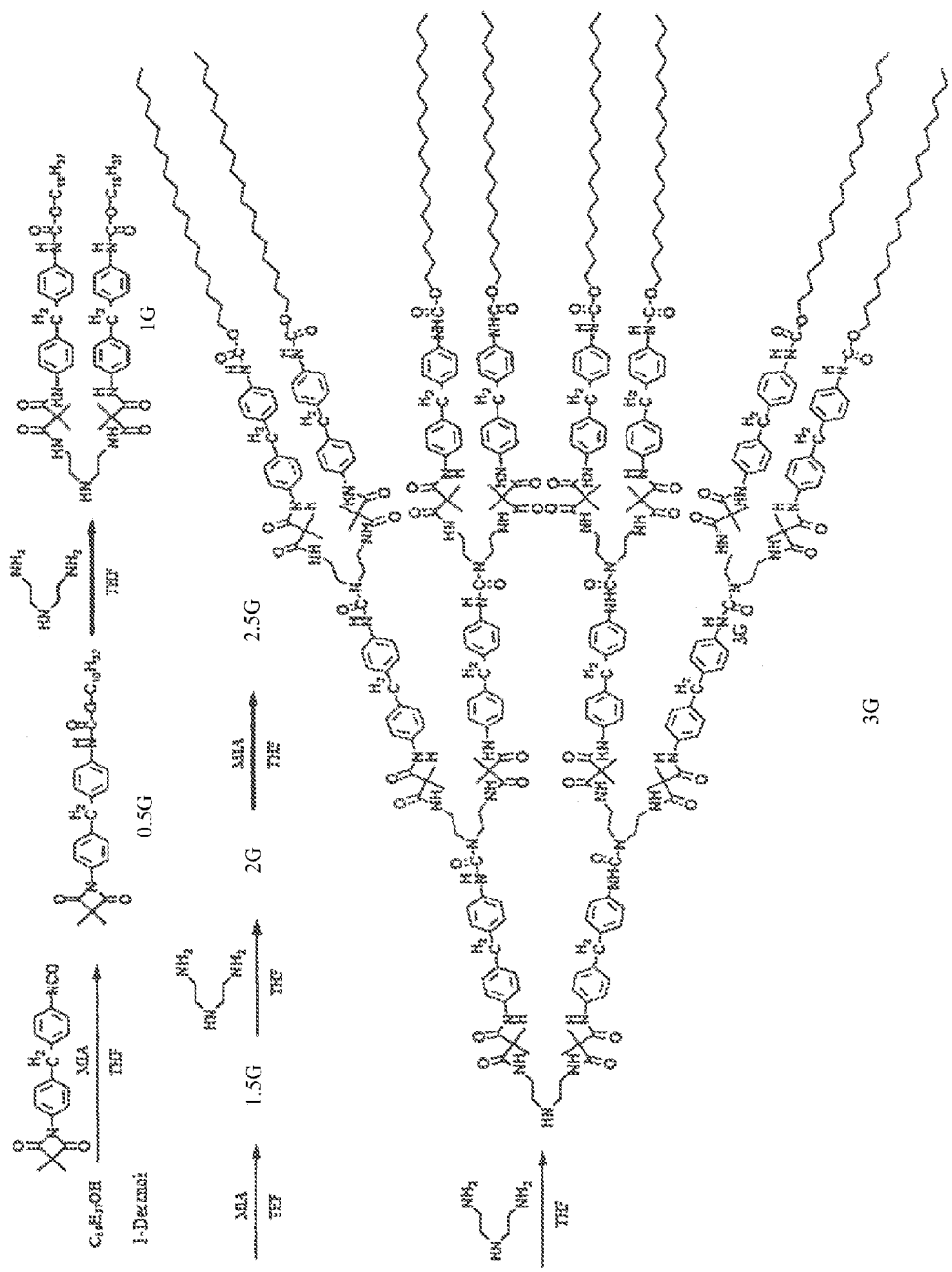
FIG. 4 is a schematic drawing showing synthesis of dendrimer with C18 chain according to the present invention.

Dissolve MIA in the tetrahydrofuran (THF) and then add decyl alcohol or stearyl alcohol into the solution while equivalence ratio of MIA to one the alcohol is 1:1. After reacting at 80° C. for 4 hours, remove the THF and add cyclohexane for purification to generate 0.5G (G represents different generations) dendrimer (single-chain type). The 0.5G dendrimer reacts with diethylenetriamine in THF, being heated at 60° C. for 3-4 hours. After purification, 1G $C_{10}$ or $C_{18}$ dendrimer (multiple-chains type) is produced. Next, the 1G $C_{10}$ or $C_{18}$ dendrimer reacts with MIA in THF to produce 1.5G $C_{10}$ or $C_{18}$ dendrimer (multiple-chains type). Furthermore, 1.5G $C_{10}$ or $C_{18}$ dendrimer reacts with diethylenetriamine in THF solvent, being heated for 3-4 hours. After purification, 2G $C_{10}$ or $C_{18}$ dendrimer is obtained. Repeat the same procedures, 2.5G $C_{10}$ or $C_{18}$ dendrimer and 3G $C_{10}$ or $C_{18}$ dendrimer are generated. Refer to FIG. 3, reaction flow of $C_{10}$ dendrimer is disclosed and reaction flow of $C_{18}$ dendrimer is in FIG. 4.

(3) Synthesis of Different Dendritic Diols

Figure 5:
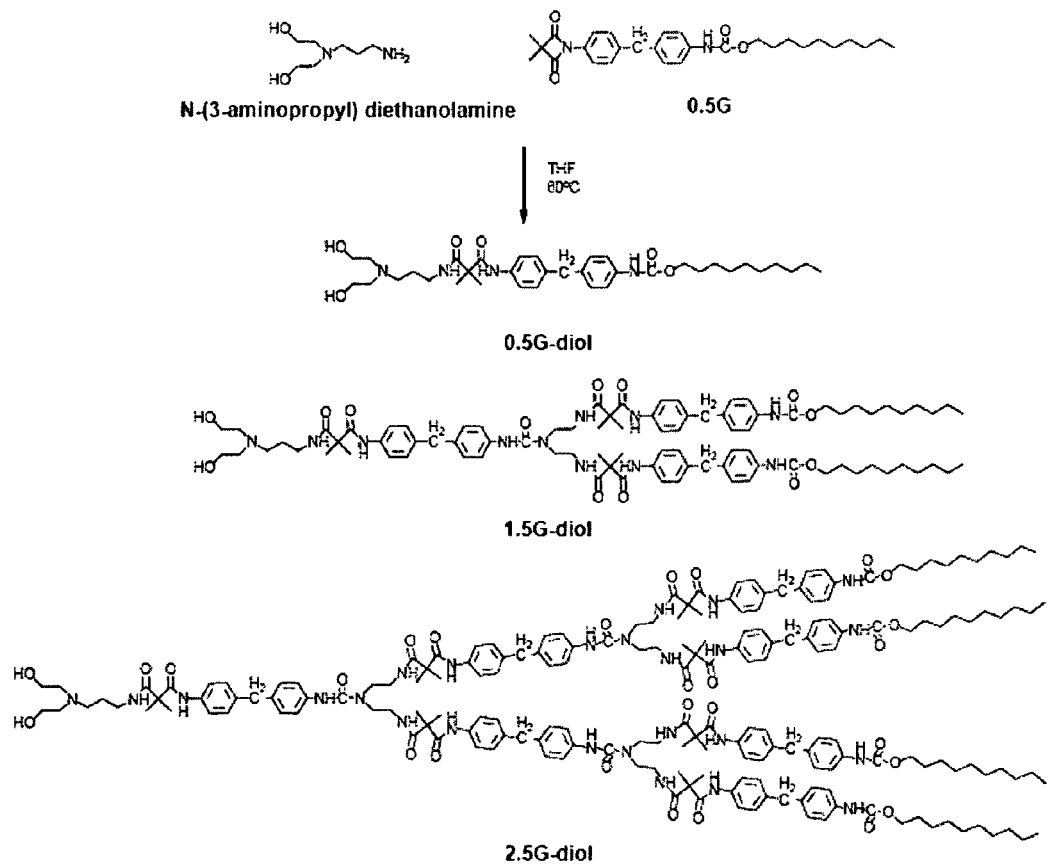
FIG. 5 is a schematic drawing showing synthesis of dendritic diol with C10 chain according to the present invention.
Figure 6:
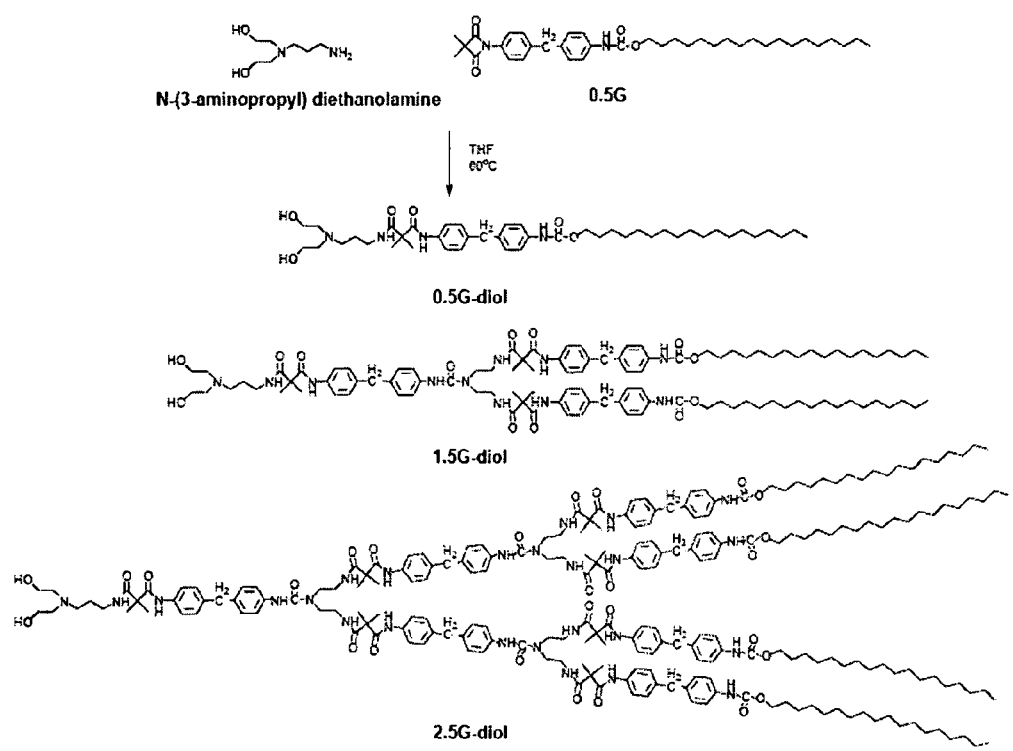
FIG. 6 is a schematic drawing showing synthesis of dendritic diol with C18 chain according to the present invention.

Respectively dissolve 0.5G, 1.5G, 2.5G $C_{10}$ or $C_{18}$ dendrimer (single-chain type or multiple chains type) together with N-(3-aminopropyl)diethanolamine in THF, reacting at 80° C. for 4 hours. The equivalence ratio of dendrimer/N-(3-aminopropyl)diethanolamine is 1:1. After purification, 0.5G, 1.5G, 2.5G $C_{10}$ or $C_{18}$ Dendritic Diols (single-chain type or multiple chains type) is produced. Refer to FIG. 5 & FIG. 6, reaction flow of $C_{10}$ Dendritic Diol and $C_{18}$ Dendritic Diol are disclosed.

(4) Synthesis and Rest of Linear Polyurethane

Figure 7:
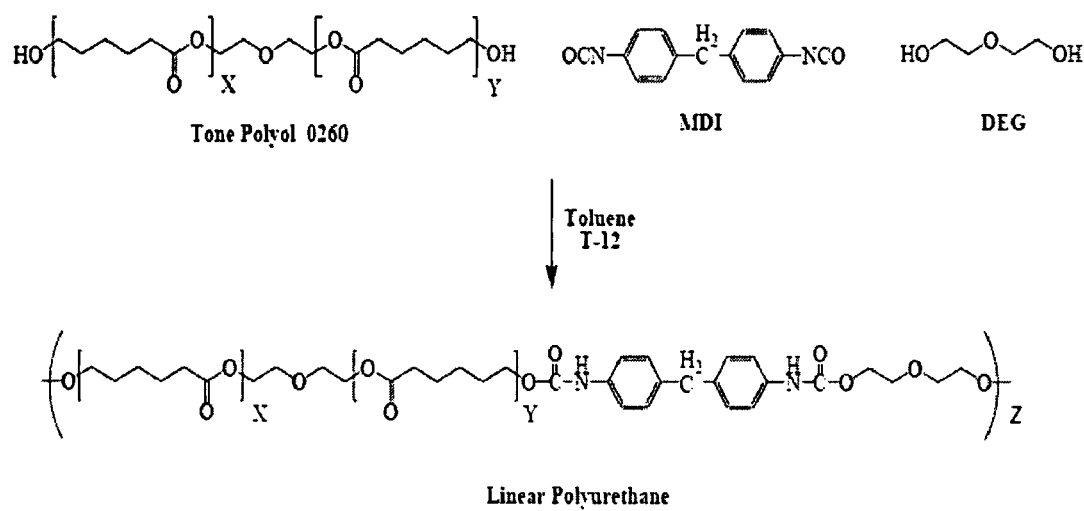
FIG. 7 is a schematic drawing showing synthesis of linear polyurethane.

Firstly, dissolve Tone Polyol 0260($HO(C_6H_{10}O_2)_x$ $C_2H_4OC_2H_4(C_6H_{10}O_2)_yOH$, x+y=25~26 (molecular weight 3000) in toluene and control the temperature of the solution at 65° C. Then add MDI and catalyst T-12 (Dibutyltin dilaurate) into the solution, reacting for 0.5 hour. Then add chain extender Di(ethylene glycol) (DEG, O(CH2CH2OH)2) and react for 3.5 hours. The final product is set into an oven to form a membrane. The flow chart is shown in FIG. 7.

(5) Synthesis and Test of Side Chain Dendritic Polyurethane (Organic Polyurethane Shape Memory Material of the Present Invention)

Figure 8:
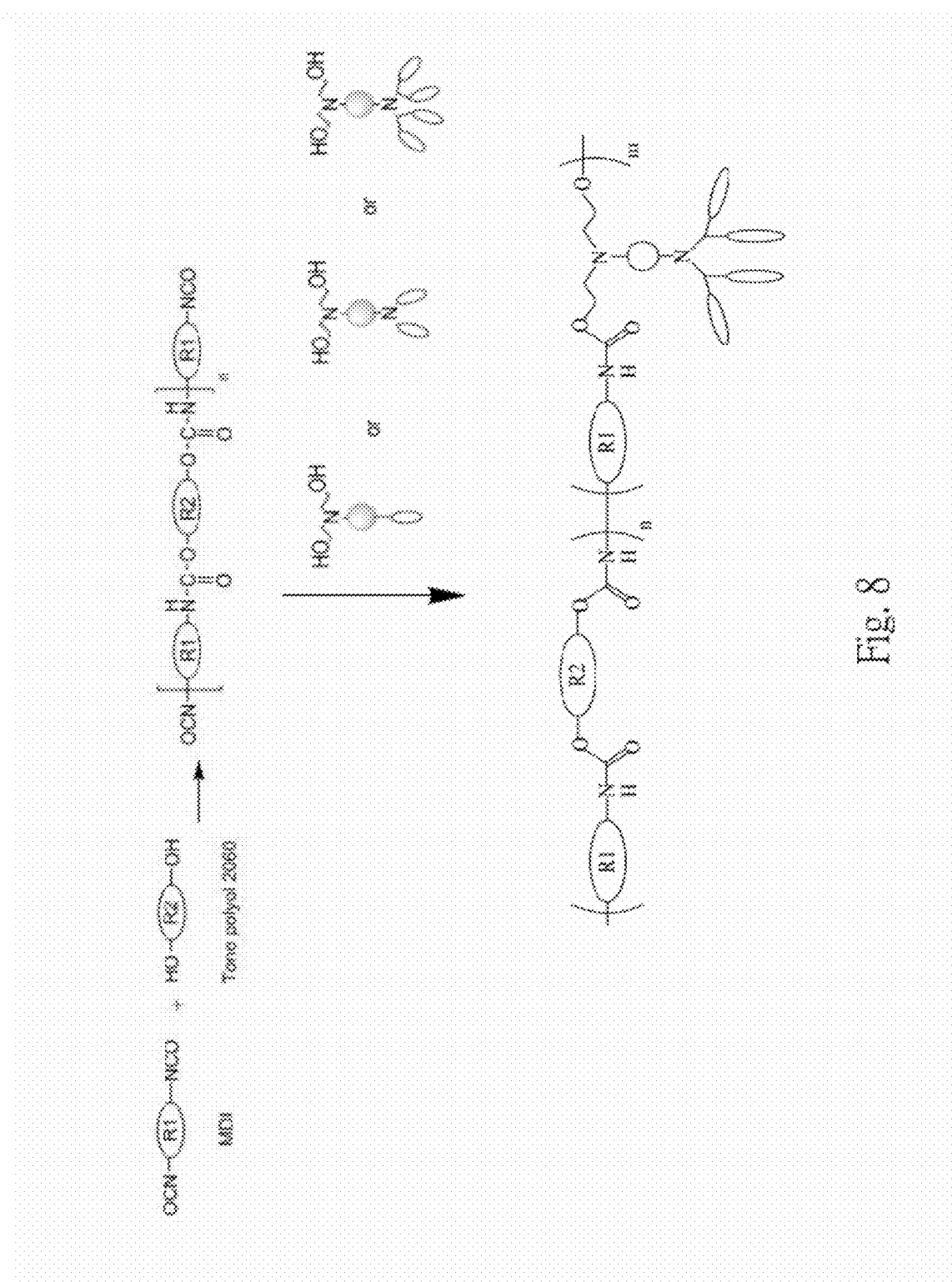
FIG. 8 is a schematic drawing showing synthesis of the organic polyurethane shape memory material according to the present invention.

Firstly, dissolve Tone Polyol 0260 in toluene and control the temperature of the solution at 65° C. Then add MDI and catalyst T-12 into the solution, reacting for 0.5 hour. Respectively add two series chain extender in different generations (0.5G dendritic diol, 1.5G dendritic diol, 2.5G dendritic diol), reacting for 3.5 hours so as to produce C10 and C18 side chain dendritic polyurethane that is shape memory material of the present invention, as shown in FIG. 8. Then the product is set into the oven at 60° C. for 24 hours to form membranes.

Samples of various linear polyurethane and side chain dendritic polyurethane are shown in list one, wherein L is DEG, D0 represents 0.5G dendritic diol, D1 represents 1.5G dendritic diol and D2 is 2.5G dendritic diol (G represents different generations) while a is C10 series and b is C18 series.

List 1: Samples of various linear polyurethane and side chain dendritic polyurethane

| Sample | Chain Extender | Tone Polyol 0260 Molar ratio | MDI | wt % of Hard segment |
|---|---|---|---|---|
| L-20 | 1 | 0.71 | 1.71 | 20.0 |
| L-25 | 1 | 0.475 | 1.475 | 25.0 |
| L-30 | 1 | 0.34 | 1.34 | 30.0 |
| L-45 | 1 | 0.161 | 1.161 | 45.1 |
| L-50 | 1 | 0.130 | 1.130 | 50.0 |
| L-55 | 1 | 0.104 | 1.104 | 55.1 |
| D0-20a | 1 | 1.78 | 2.78 | 20.0 |
| D0-25a | 1 | 1.19 | 2.19 | 25.0 |
| D0-30a | 1 | 0.86 | 1.86 | 30.0 |
| D0-45b | 1 | 0.455 | 1.455 | 45.0 |
| D0-50b | 1 | 0.365 | 1.365 | 50.0 |
| D0-55b | 1 | 0.293 | 1.293 | 55.1 |
| D1-45b | 1 | 0.915 | 1.915 | 45.0 |
| D1-50b | 1 | 0.730 | 1.730 | 50.1 |

List 1: Samples of various linear polyurethane and side chain dendritic polyurethane

| Sample | Chain Extender | Tone Polyol 0260 Molar ratio | MDI | wt % of Hard segment |
|---|---|---|---|---|
| D1-55b | 1 | 0.590 | 1.590 | 55.0 |
| D2-45b | 1 | 1.83 | 2.83 | 45.1 |
| D2-50b | 1 | 1.47 | 2.47 | 50.0 |
| D2-55b | 1 | 1.18 | 2.18 | 55.1 | a is C10 series
b is C18 series (1) Analysis and Identification of Dendrimer

Figure 9:
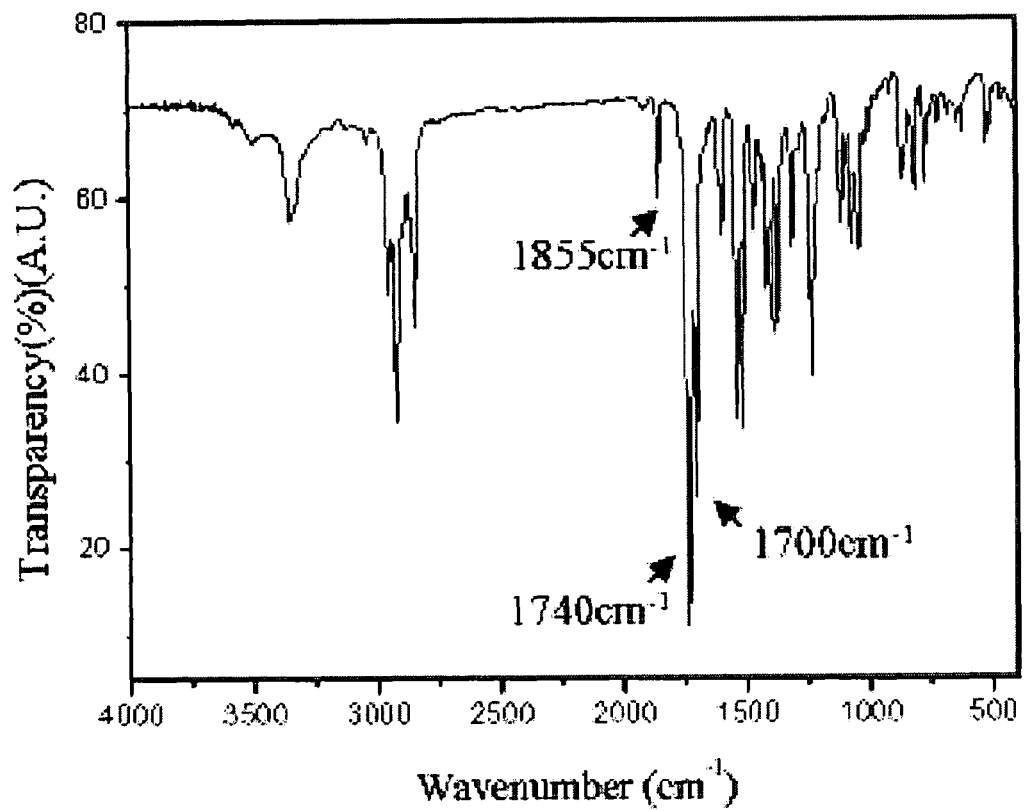
FIG. 9 is a FTIR spectrum of monitoring reaction of 0.5G dendrimer according to the present invention.
Figure 10:
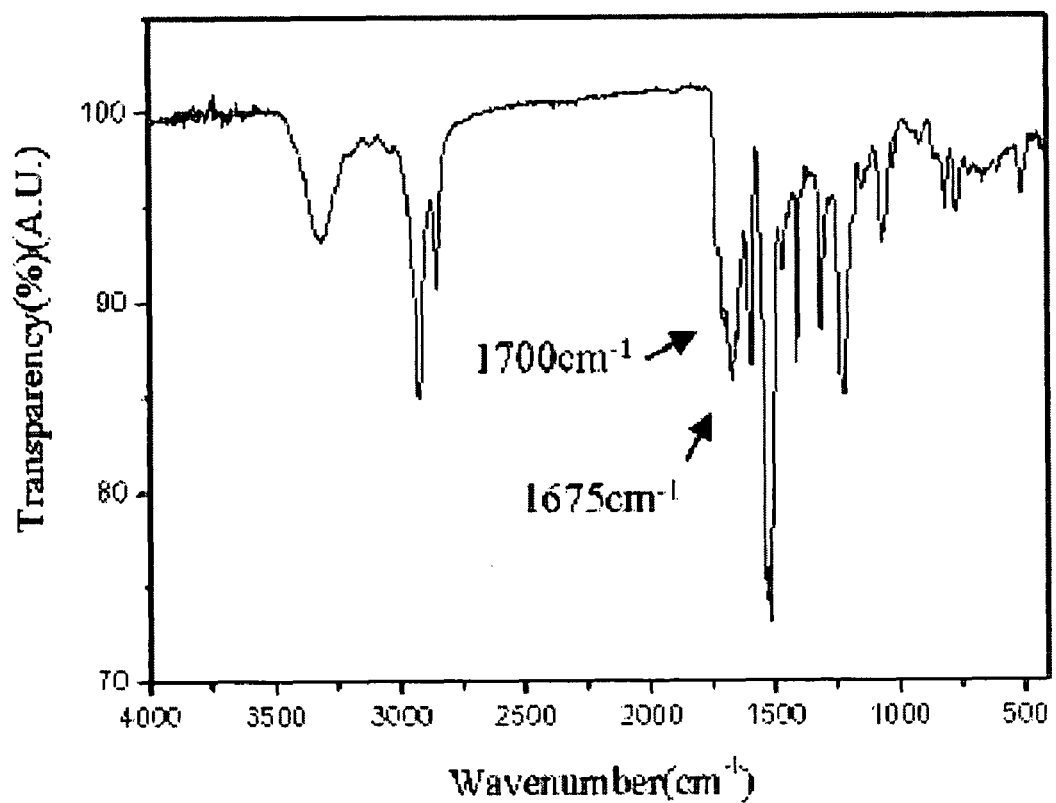
FIG. 10 is a FTIR spectrum of monitoring reaction of 1G dendrimer according to the present invention.

Taking C10 dendrimer as an embodiment, in production of 0.5G dendrimer, MIA and 1-decanol with equivalence ratio of 1 are dissolved in THF, reacting at 80° C. for 4 hours. The yield of addition reaction is 95% and is monitored by Fourier Transform Infrared spectrometry (FTIR). As shown in FIG. 9, a characteristic absorption peak (N═C═O) disappears at 2260 cm$^{-1}$ while another peak (C═O of urethane) is generated at 1700 cm$^{-1}$. By $^1$H NMR (Proton Nuclear Magnetic Resonance Spectroscopy) analysis, the chemical shift (ppm) of the compounds are as following: 3.30 (4H, m, CH2(N)), 3.86 (4H, s, Ar—CH2-Ar) and 4.02 (4H, t, CH2). Next, IG product is prepared by a ring-opening addition reaction at 60° C. and the reaction yield is 95%. The reaction is also monitored by FTIR and the characteristic absorption peak disappears at 1738 cm$^{-1}$ and 1856 cm$^{-1}$ (C═O of azetidine-2,4-dione), as shown in FIG. 10 while another peak (C═O of malonamide) is generated at 1675 cm$^{-1}$. The $^1$H NMR spectroscopy shows the chemical shift (ppm) of the compounds are 3.30 (4H, m, CH2(N)), 3.94 (4H, s, Ar—CH2-Ar) and 4.02 (4H, t, CH$_2$). Then the same methods are applied to analyze and identify the products.

Refer to list 2, structure of 0.5G to 3G dendrimer with C10 chain (C10 series) is analyzed by $^1$H NMR, CHN element Analysis, and mass spectrometry.

List 2: molecular weight and polydispersity index (PDI) of 0.5 G-3 G dendrimer

| Compound | Calcd. M$_w$ | M$_w$$^a$ | M$_w$$^b$ | M$_n$$^b$ | PDI$^b$ |
|---|---|---|---|---|---|
| 0.5 G | 478.6 | 478 | 565 | 547 | 1.03 |
| 1 G | 1060.4 | 1060 | 1711 | 1654 | 1.03 |
| 1.5 G | 1380.8 | 1380 | 2099 | 2054 | 1.02 |
| 2 G | 2864.7 | 2864 | 3996 | 3917 | 1.02 |
| 2.5 G | 3185.0 | 3185 | 4396 | 4283 | 1.02 |
| 3 G | 6473.2 | 6473 | 8635 | 8465 | 1.02 |

$^a$means measured by Fab MS (fast atom bombardment-mass spectrometry) and MALDI-TOF MS (matrix assisted laser desorption ionization time of flight mass spectrometry).
$^b$means analyzed by gel permeation chromatograph (GPC).

Refer to list 3, structure of 0.5G to 2.5G dendrimer with C18 chain (C18 series) is analyzed by $^1$H NMR, CHN element Analysis, and mass spectrometry.

List 3: molecular weight of 0.5 G-2.5 G dendrimer

| Compound | Calcd. M$_w$ | M$_w$$^a$ |
|---|---|---|
| 0.5 G | 590.8 | 591 |
| 1 G | 1284.8 | 1285 |
| 1.5 G | 1605.2 | 1605 |
| 2 G | 3313.5 | 3314 |
| 2.5 G | 3633.9 | 3634 |

$^a$means measured by Fab MS and MALDI-TOF MS (2) Dendritic Diol

Figure 11:
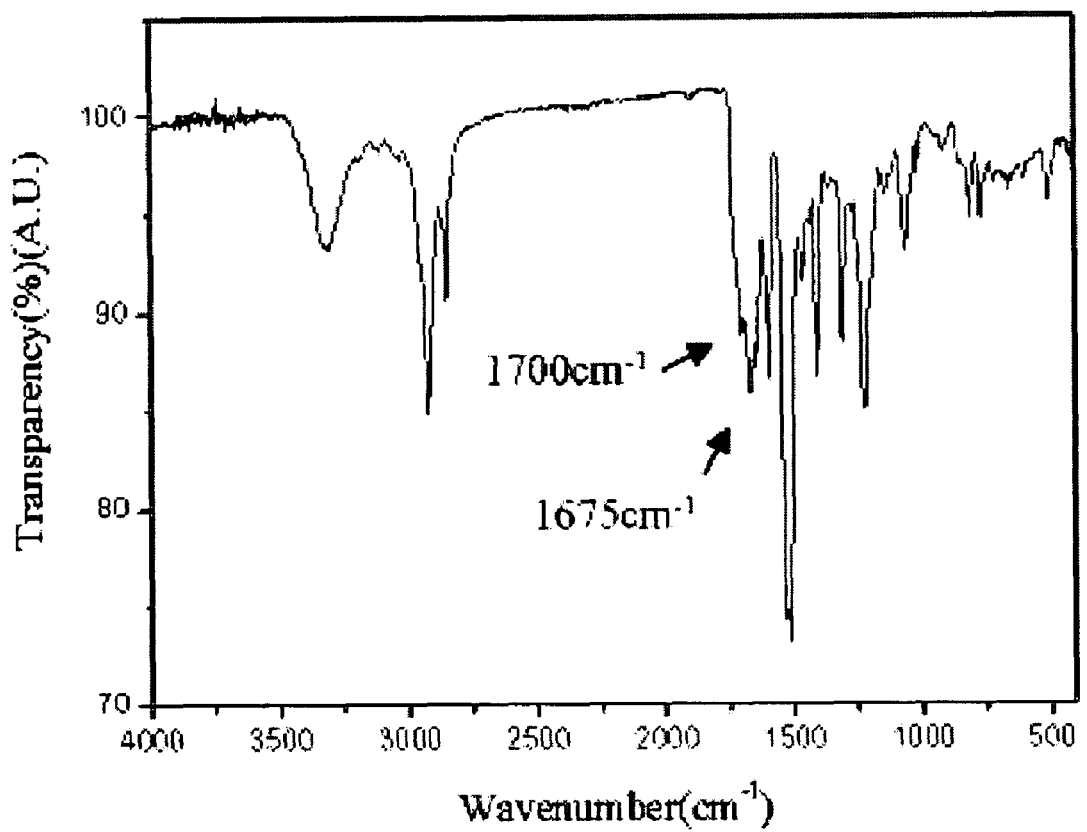
FIG. 11 is a FTIR spectrum of monitoring reaction of 0.5G Dendritic Diol according to the present invention.
Figure 12:
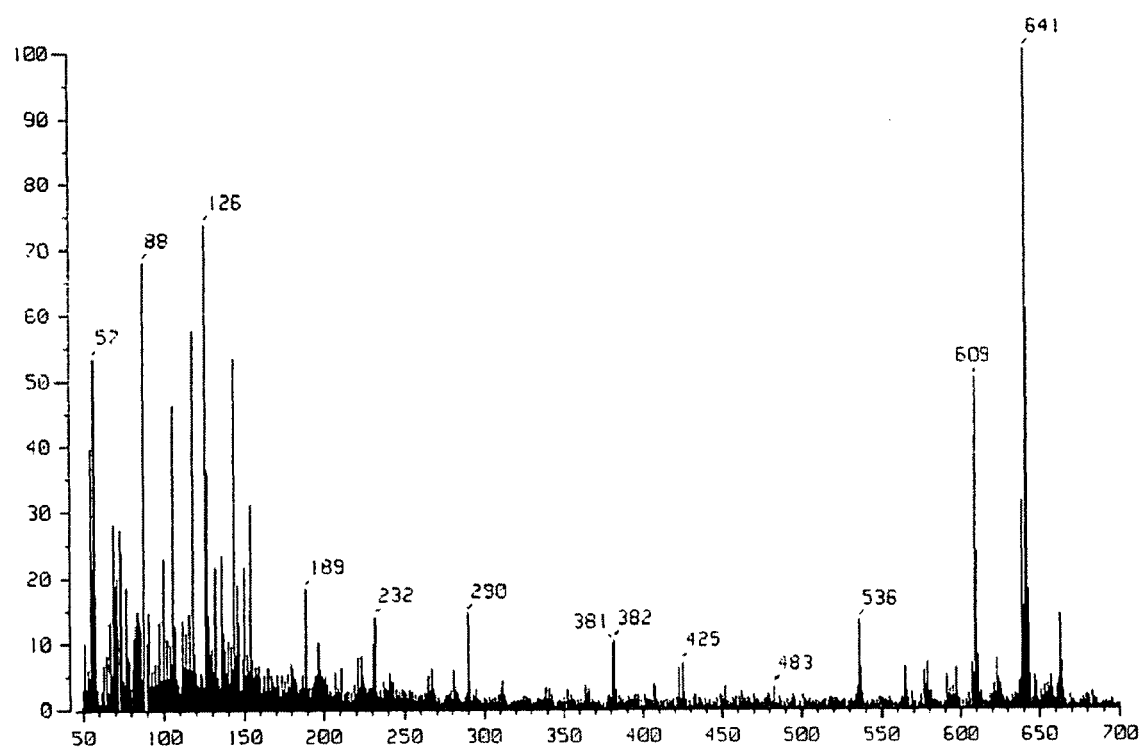
FIG. 12 is a Fab MS spectrum of 0.5G Dendritic Diol according to the present invention.

Taking Dendritic diol with C10 chain as an example, in synthesis of 0.5G dendrimer diol, 0.5G dendrimer and N-(3-aminopropyl)diethanolamine with equivalence ratio of 1:1 are dissolved in THF, reacting at 80° C. for 4 hours. The solution is purified by column chromatography and thin layer chromatography with elution buffer of Ethyl Acetate and Acetone. The yield of this ring-opening addition reaction is 95% and is monitored by Fourier Transform Infrared spectrometry (FTIR). As shown in FIG. 11, the characteristic absorption peak $^1$(C═O of azetidine-2,4-dione) disappears at 1738 and 1856 cm$^{-1}$ while other peaks (C═O of malonamide) (—OH) are respectively generated at 1675 and 3450 cm$^{-1}$. Refer to FIG. 12, chemical structure of the compound is identified by $^1$H NMR and Fab MS=641 m/z (M$^+$). After ring opening of azetidine-2,4-dione, the chemical shift of (4H, s, Ar—CH2-Ar) moves from 3.94 to 3.86 ppm. Then the same methods are applied to analyze and identify the products.

Dendritic Diol with C18 Chain

Figure 13A:
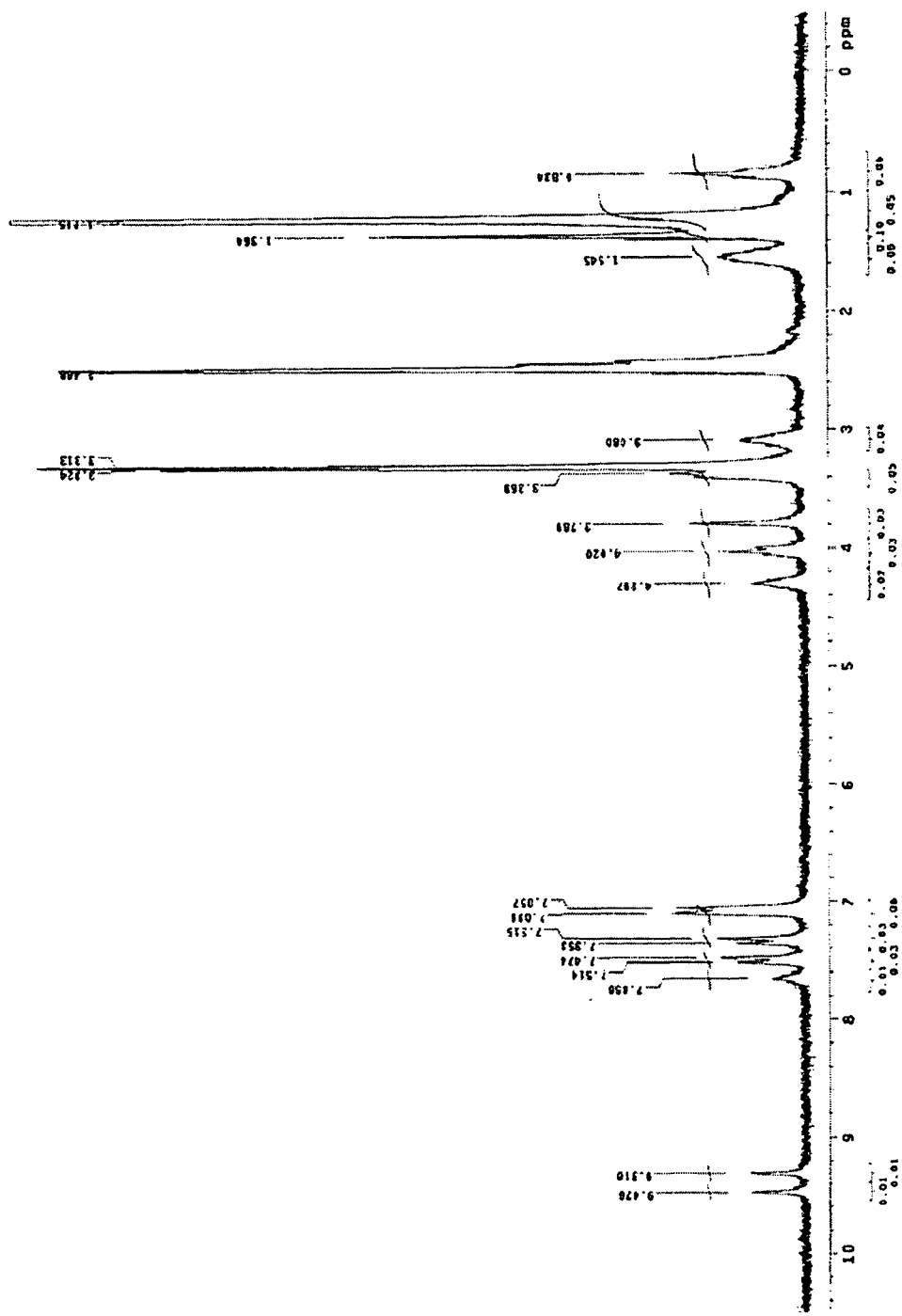
FIG. 13A is a $^1H$ NMR spectrum of 0.5G Dendritic Diol according to the present invention.
Figure 13B:
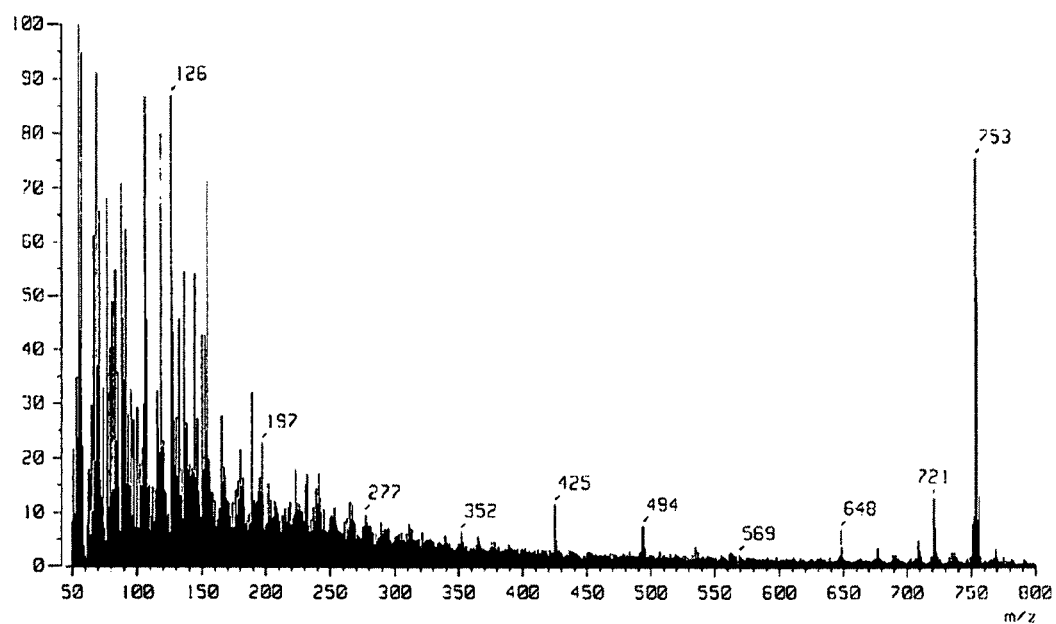
FIG. 13B is a Fab MS spectrum of 0.5G Dendritic Diol according to the present invention.
Figure 14:
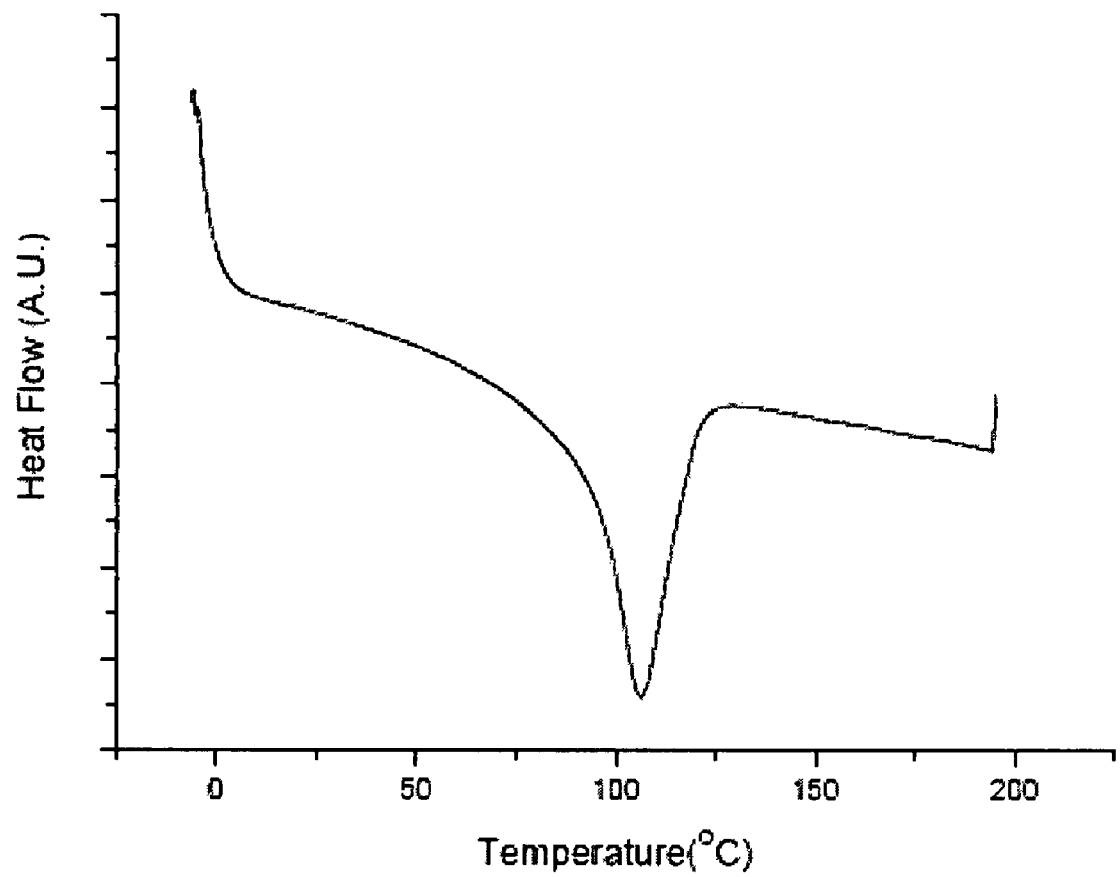
FIG. 14 is a DSC curve of 0.5G Dendritic Diol according to the present invention.

Refer to FIG. 13A, chemical structure of 0.5G Dendritic diol is identified by $^1$H NMR shown in FIG. 13A, Fab MS=753 m/z (M$^+$) shown in FIG. 13B, and differential scanning calorimetry (DSC) shown in FIG. 14. After ring opening of azetidine-2,4-dione, the chemical shift of (4H, s, Ar—CH2-Ar) moves from 3.94 to 3.86 ppm. Next the same methods are applied to analyze and identify the products. Moreover, by DSC, it is observed that melting point (Tm) of the 0.5G Dendritic diol is 110° C.

Figure 15A:
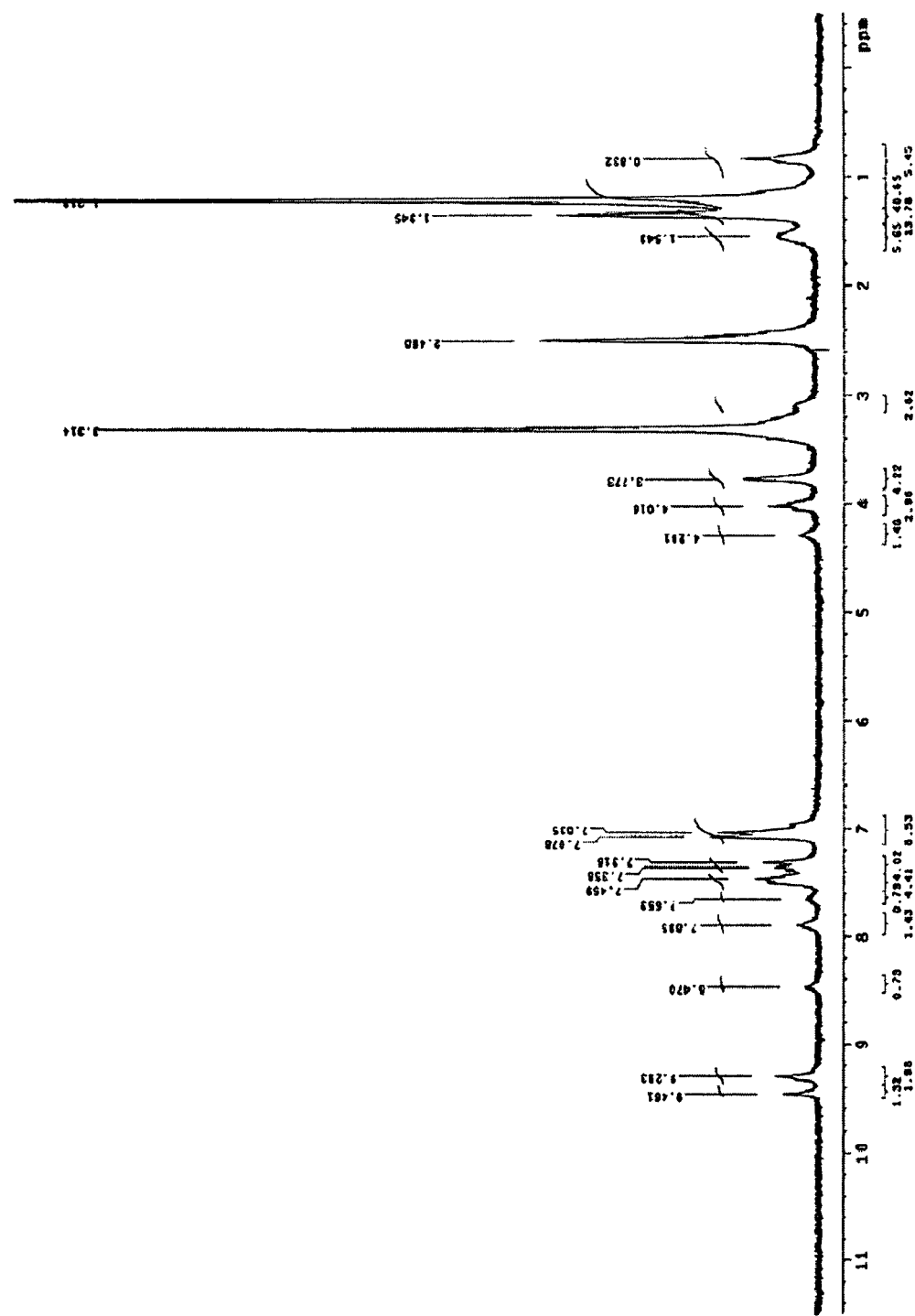
FIG. 15A is a $^1H$ NMR spectrum of 1.5G Dendritic Diol according to the present invention.
Figure 15B:
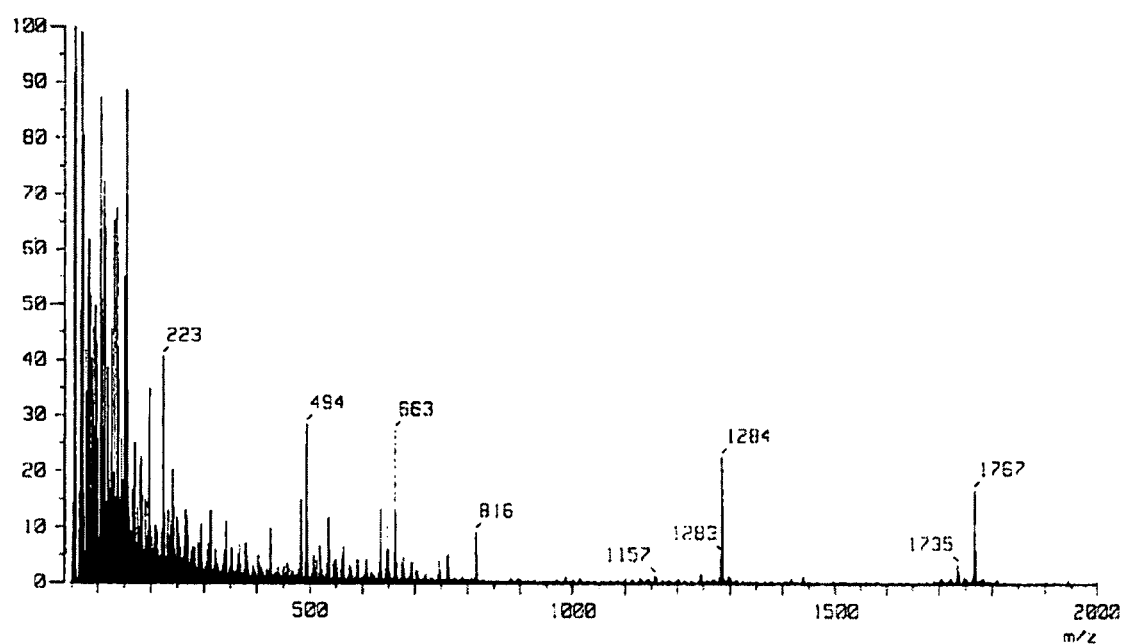
FIG. 15B is a Fab MS spectrum of 1.5G Dendritic Diol according to the present invention.

During synthesis processes of 1.5G Dendritic diol, 1.5G dendrimer and N-(3-aminopropyl)diethanolamine with equivalence ratio of 1 are dissolved in THF, reacting at 80° C. for 4 hours. The solution is purified by the same method as the 0.5G Dendritic diol. The yield of this ring-opening addition reaction is 65% and is also monitored by Fourier Transform Infrared spectrometry as the 0.5G Dendritic diol. Refer to FIG. 15, $^1$H NMR analysis of the 1.5G Dendritic diol is disclosed while analysis result of Fab MS=1767 m/z (M$^+$) is shown in FIG. 15B.

Figure 16A:
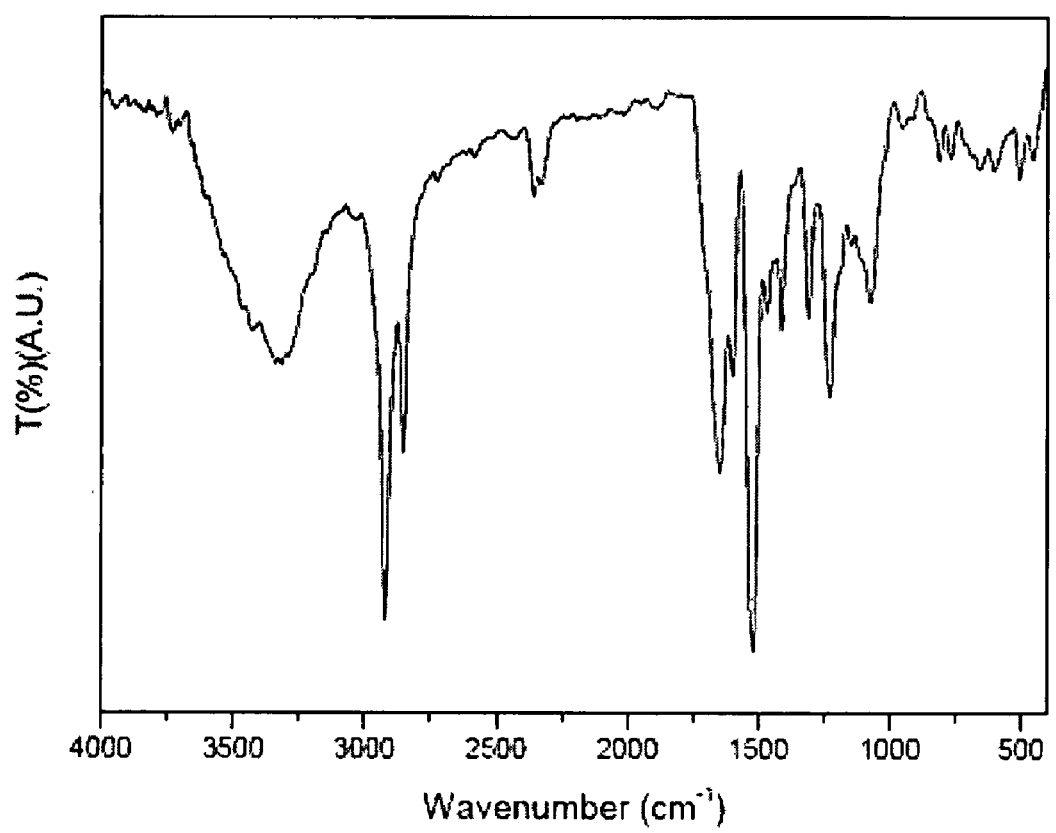
FIG. 16A is a FT-IR spectrum of 2.5G Dendritic Diol according to the present invention.
Figure 16B:
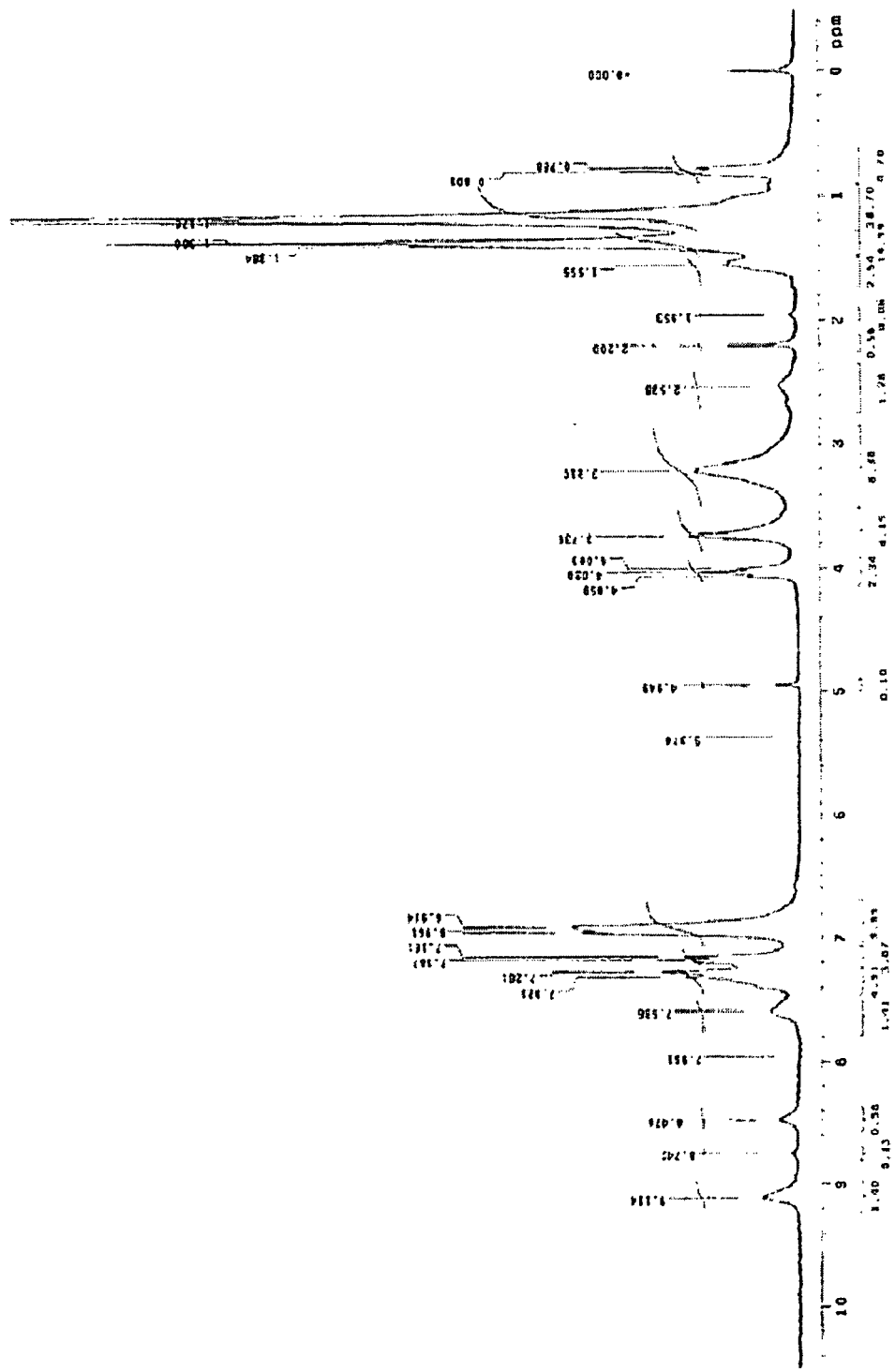
FIG. 16B is a NMR spectrum of 2.5G Dendritic Diol according to the present invention.

In synthesis of 2.5G Dendritic diol, 2.5G dendrimer and N-(3-aminopropyl)diethanolamine with equivalence ratio of 1:1 are dissolved in THF, reacting at 80° C. for 4 hours. The solution is purified by the same method as the 0.5G Dendritic diol. The yield of this ring-opening addition reaction is 65% and is also monitored by Fourier Transform Infrared spectrometry as the 0.5G Dendritic diol. Refer to FIG. 16A, Fourier Transform Infrared spectrometry spectrum is shown and NMR spectrum is in FIG. 16B.

(3) Polyurethane Series

Figure 17A:
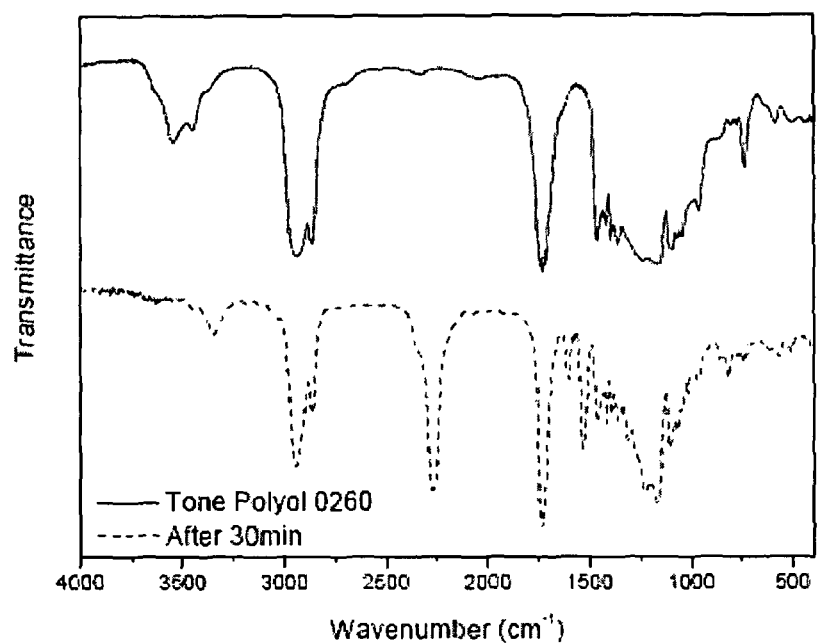
FIG. 17A is a FTIR spectrum of monitoring reaction of polyurethane.
Figure 17B:
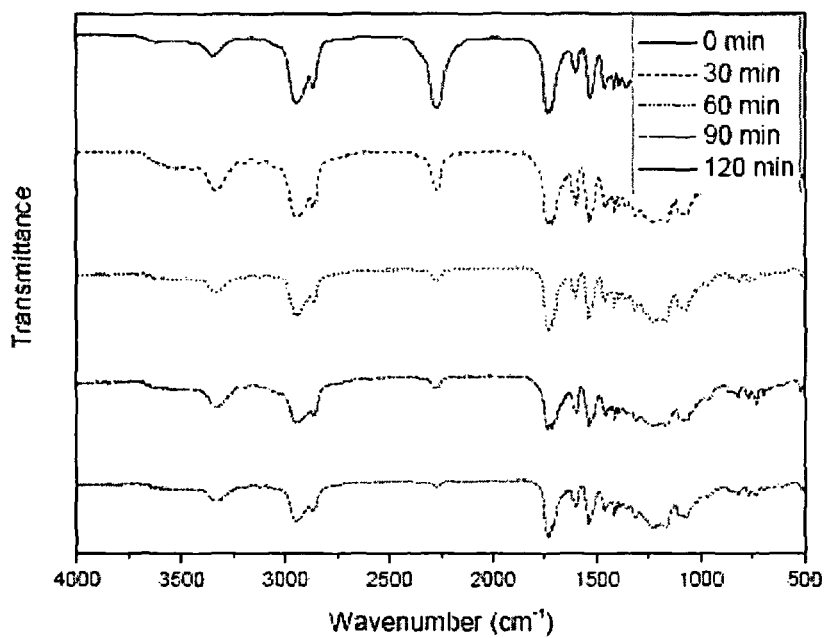
FIG. 17B is another FTIR spectrum of monitoring reaction of polyurethane.

Tone Polyol 0260 is dissolved in tolene that is separated with water, add MDI and T-12 into the solution, reacting at 65° C. and monitored by FTIR. Refer to FIG. 17A & FIG. 17B, the characteristic absorption peak of OH group OF Polyol at 3556 cm$^{-1}$ disappears after 0.5 hour/Then immediately add into chain extender DEG or Dendritic diol. After 3.5 hours, it is observed peak at 2260 cm$^{-1}$ (N═C═O) disappears and it is judged that the reaction is over. Then the product is set in the oven at 60° C. for 24 hours to form membranes.

Figure 18:
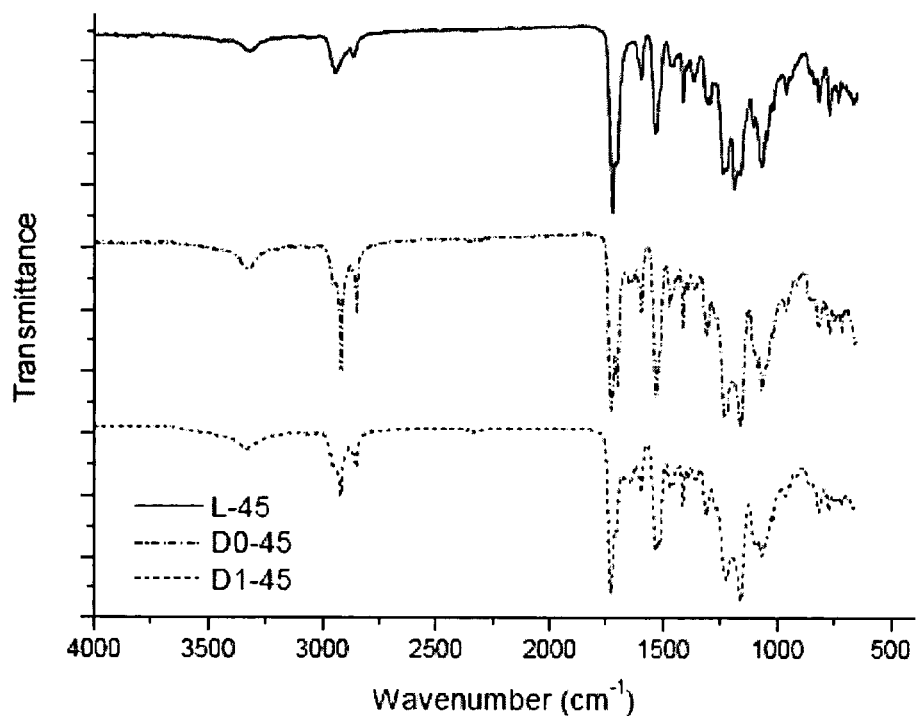
FIG. 18 is an ATR-FTIR spectrum of linear polyurethane and organic polyurethane shape memory material with 45 wt % hard segment according to the present invention.

Refer to FIG. 18, in a Fourier transform attenuated total reflection infrared spectrometry (ATR-FTIR), the presence of characteristic absorption peak at 3325 cm$^{-1}$ for the NH group in urea, amide and urethane is found obviously. The characteristic absorption peak for CH2 group is present at 2950, 2920 and 2850 cm$^{-1}$. Moreover, the characteristic absorption peak for C=O group also form at 1730, 1705, and 1654 cm$^{-1}$, peaks at 1730 and 1705 cm$^{-1}$ are contributed by urethane while peak at 1654 cm$^{-1}$ is contributed by malonamide and urea. Take c18 chain with 45% hard segment, it is found that in the dendrimer system (D0 and D1), the characteristic absorption peak of urethane is separated and present at 1730 and 1705 cm$^{-1}$ due to multi-hydrogen-bonds of malonamide and urea at 1650 cm$^{-1}$. It is learned from literature that this phenomenon is caused by material with microscopic phase separation. Because malonamide has strong hydrogen bonding, dendrimer is introduced into polyurethane so as to increase molecular interaction for increasing mechanical properties. By the strong hydrogen bonding and long carbon chain, Van der Walls' Force is formed so as to induce formation of hard domain. Thus both soft segment and hard segment in polyurethane are separated and memory as well as recovery effect of the shape memory material is enhanced.

Figure 19A:
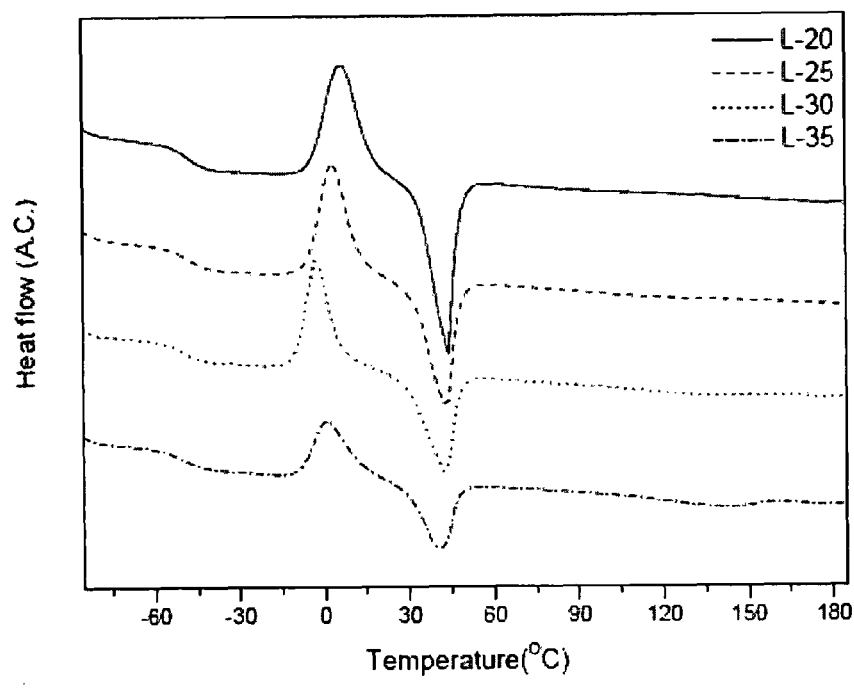
FIG. 19A is a DSC curve of L-series polyurethane.
Figure 19B:
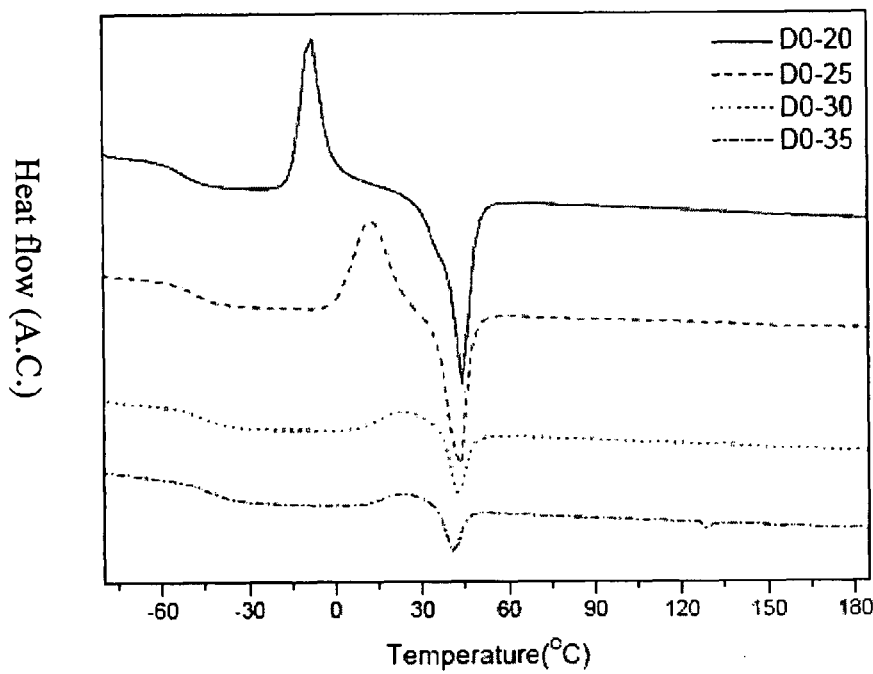
FIG. 19B is a DSC curve of D0-series (C10) polyurethane according to the present invention.

Thermal properties of polyurethane are discussed through DSC. The temperature is increased 10° C. per minute while temperature decreasing is 20° C. per minute. Compared L-series with C10 series, refer to FIG. 19A & FIG. 19B, it is observed that glass transition temperature (Tg) of the soft segment of L-series is all the same −47° C. and this value is not changed along with change of hard segment amount. Moreover, the melting point (Tm) of the soft segment is 42° C. The heat of fusion (□Hm) and heat of crystallization (□Hc) are decreased along with increasing of the hard segment amount thus it is known that crystallinity of soft segment is destructed by introduction of hard segment. Therefore, a certain degree phase separation exists due to interactions between soft segments and hard segments. However, influence of the hard segment is not obvious here. As to D0 series, along with increasing of the hard segment amount, glass transition temperature (Tg) of the soft segment increases from −52° C. to −43° C. while the melting point (Tm) of the soft segment is decreased from 44° C. to 40° C. At the same time, The heat of fusion and heat of crystallization are both reduced. However, glass transition temperature (Tg) of the hard segment of above two series is not obvious.

Figure 20A:
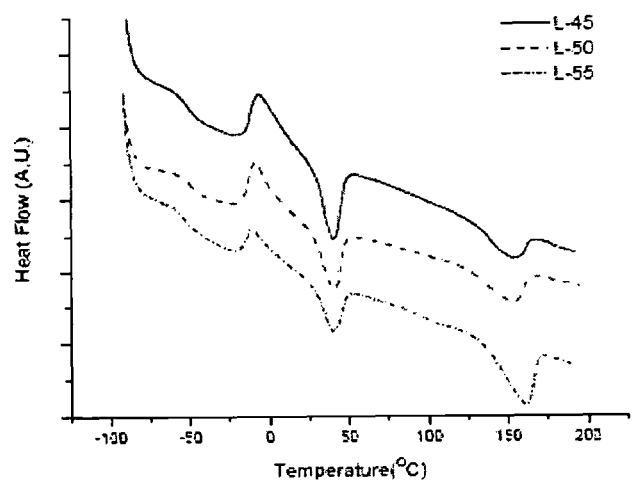
FIG. 20A is a DSC curve of L-series polyurethane.
Figure 20B:
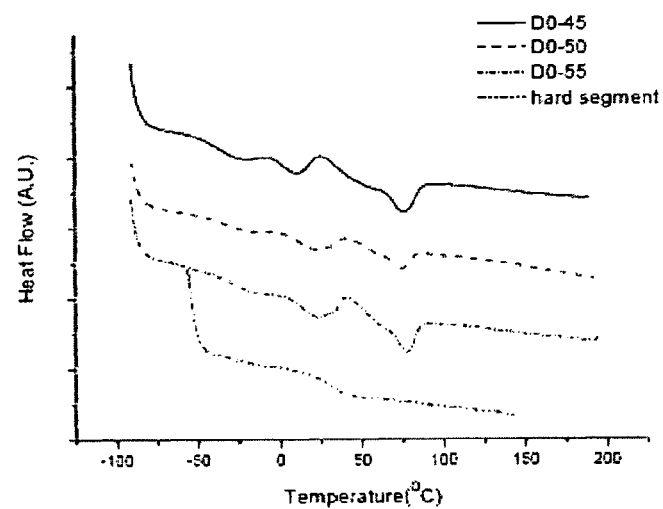
FIG. 20B is a DSC curve of D0-series polyurethane according to the present invention.
Figure 20C:
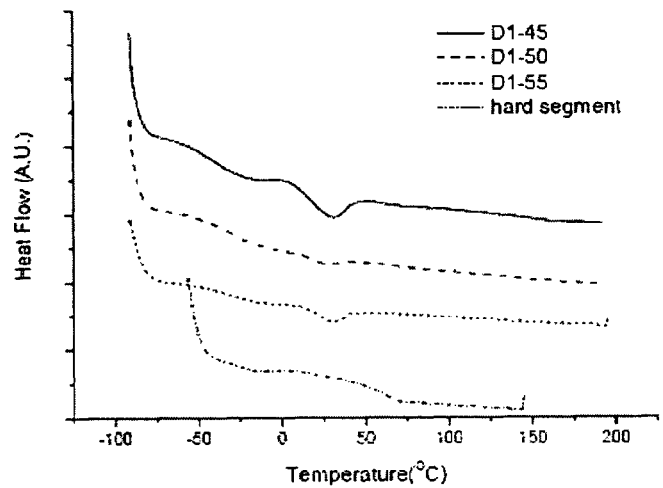
FIG. 20C is a DSC curve of D1-series (C18) polyurethane according to the present invention.

Compared L-series with C18 series, refer to FIG. 20A, FIG. 20B and FIG. 20C, it is observed that glass transition temperature (Tg) of the soft segment of L-series is all the same −50° C. and this value is not changed along with change of hard segment amount. Moreover, the melting point (Tm) of the soft segment is 40° C. while the heat of fusion (□Hm) and heat of crystallization (□Hc) are decreased along with increasing of the hard segment amount thus it is known that crystallinity of soft segment is destructed by introduction of hard segment. Therefore, a certain degree phase separation exists due to interactions between soft segments and hard segments. Compare with C10 series, the melting point of the hard segment is shown at 160° C. and is increased along with increasing of hard segment. The heat of fusion is also increased. Thus means influence of the hard segment is getting increased. As to D0 series, along with increasing of the hard segment amount, glass transition temperature (Tg) of the soft segment increases from −39° C. to −26° C. This means the introduction of dendrimer leads to phase mixing of soft segment and hard segment. A point of intersection shows at about 25° C. It is learned through the control group (0.5G diol+MDI) that this is the glass transition temperature of the pure hard segment. Furthermore, an endothermic peak shows at 75° C. due to increasing content of phase mixing of soft segment and hard segment that results in change of crystal type of soft segment. Thus the temperature jumps to 75° C. For D1 series, along with increasing of the hard segment amount, glass transition temperature (Tg) of the soft segment increases from −45° C. to −31° C. The melting point of the soft segment is 30° C. The differences between D1 and other series is in that crystallization peak is almost disappeared. It is speculated side chain dendritic group increased along with increasing of generations. The soft segment is difficult to stacked dye to steric hindrance. Furthermore, glass transition temperature of pure hard segment synthesis by 1.5G diol+ MDI is 50° C. It is found that the glass transition temperature of pure hard segment is increased along with increasing of generations.

In order to test shape-memory property, a rectangular sample (3 cm×1 cm) is cut and is deformed at ninety degrees at Tm (60° C.) of the soft segment. After deformation, the shape is fixed at temperature lower than Tg. Then the mold is taken off. Observe recovery angle respectively at room temperature (25° C.) and 60° C. and calculate the recovery rate by this angle. But when the hard segment amount is lower than 35% of the L-series and D0 (C10) series, the test sample is melt into flow state and is unable to do any tests. The possible reason is due to lack of physical crosslinking of the hard segment, and earlier degradation of hydrogen bonding as well as Van der Walls' Force.

Figure 21:
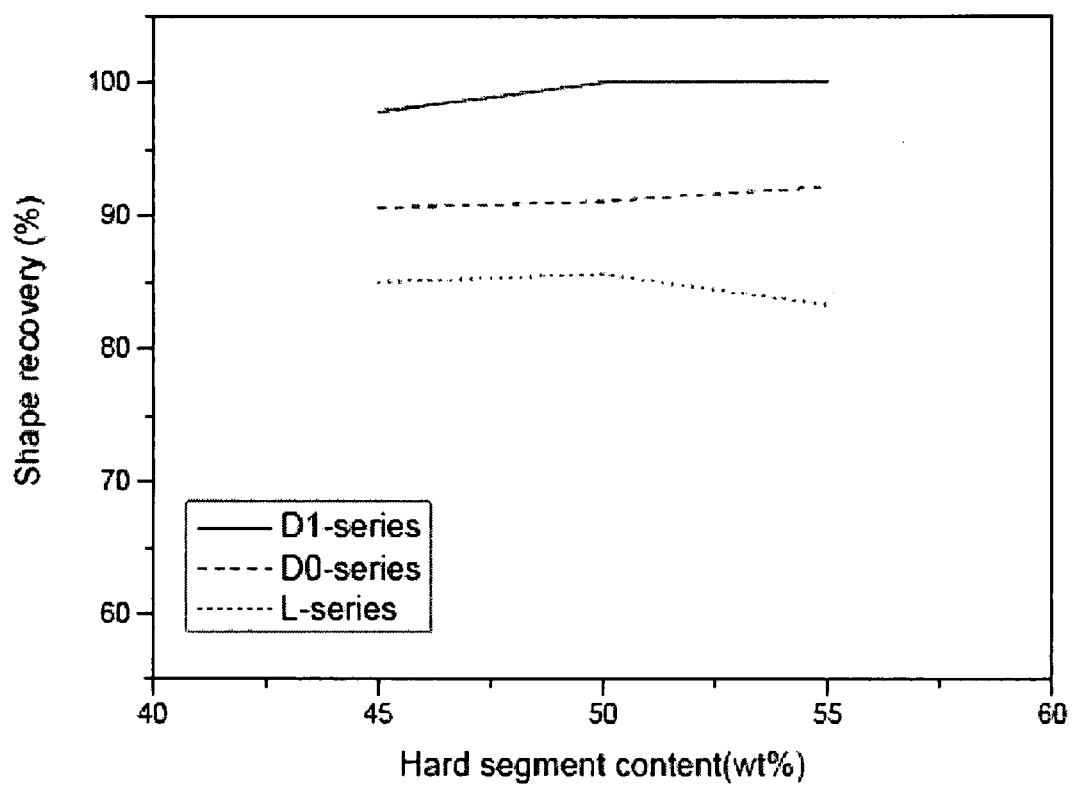
FIG. 21 is a comparison chart showing recovery rate of L-series, D0-series and D1-series (C18) polyurethane according to the present invention.

In order to improve defects of the material, chain extender of original Decyl Alcohol ($C_{10}H_{21}OH$) is replaced by Dendritic diol with an end-group of 1-Octadecanol ($C_{18}H_{37}OH$) so as to increase amount of hard segment up to over 45% for increasing temperature range of the material being applied. Refer to list 3 and FIG. 21, the result shows that recovery rate of the L-series ranged from 82%~85%, not increasing along with the amount of hard segment. In list 3, a represents side chain dendritic polyurethane with C18 chain. As to D0 series (C18), the recovery rate is highly as 90%~92%. As to D1 series (C18), the recovery rate is getting higher to 97%~100% and the recovery rate is increased along with the increasing amount of hard segment. It is learned that along with introduction of dendrimer, the recovery effect of the material is dramatically improved. Moreover, along with development of new-generation dendrimer, the recovery effect is further enhanced. The main reason of such enhanced recovery effect is due to increased physical crosslinking caused by strong hydrogen bonding and Van der Walls' Force in dendrimer.

List 4: Recovery angle and recovery rate of the shape-test

| | The first test | | | The second test | | |
|---|---|---|---|---|---|---|
| Sample | 25° C. | 60° C. | Recovery rate % | 25° C. | 60° C. | Recovery rate % |
| L-45 | 49° | 13.5° | 85.0 | 42° | 13.5° | 85.0 |
| L-50 | 49° | 13° | 85.6 | 36.5° | 14° | 84.4 |
| L-55 | 50° | 15° | 83.3 | 49° | 15.5° | 82.8 |
| D0-45[a] | 50° | 8.5° | 90.6 | 43° | 7° | 92.2 |
| D0-50[a] | 48° | 8° | 91.1 | 44.5° | 8° | 91.1 |
| D0-55[a] | 47° | 7° | 92.2 | 45.5° | 7.5° | 91.7 |
| D1-45[a] | 52° | 2° | 97.8 | 41.5° | 2.5° | 97.2 |
| D1-50[a] | 49° | 0° | 100 | 41° | 1° | 98.9 |
| D1-55[a] | 46° | 0° | 100 | 42° | 2.5° | 97.2 |

Figure 22A:
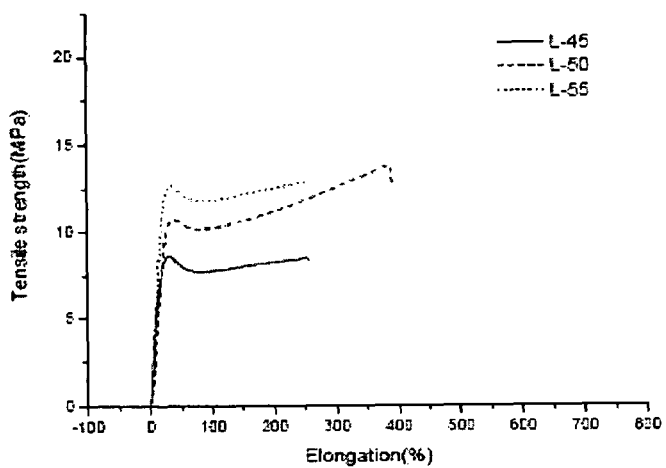
FIG. 22A shows relationship between tensile strength and elongation rate of L-series according to the present invention.
Figure 22B:
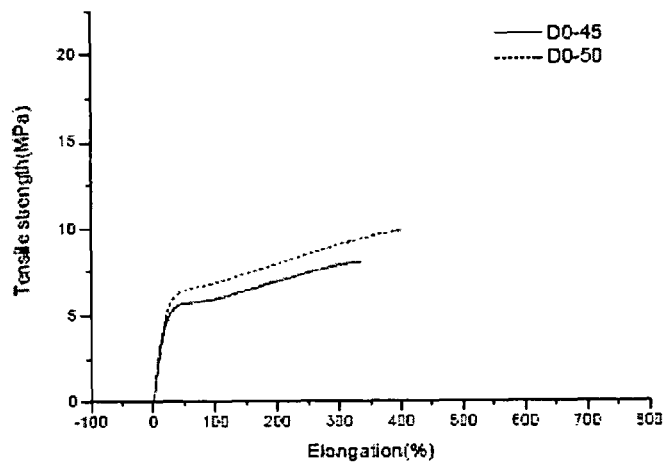
FIG. 22B shows relationship between tensile strength and elongation rate of D0-series polyurethane according to the present invention.
Figure 22C:
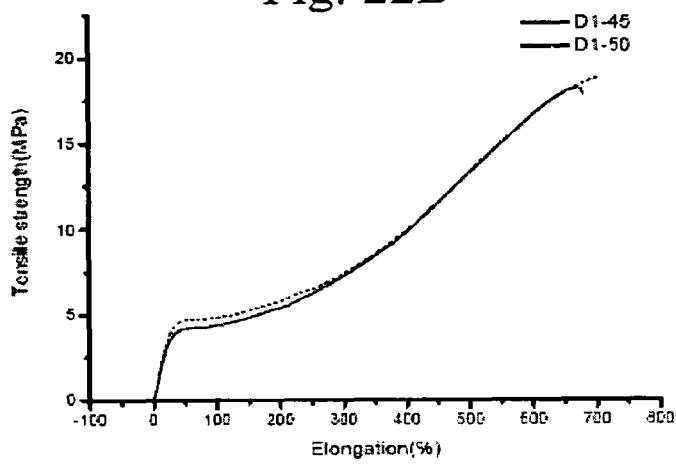
FIG. 22C shows relationship between tensile strength and elongation rate of D1-series (C18) polyurethane according to the present invention.

Mechanical properties are analyzed by a universal tensile tester according to stress/strain conditions in ASTM D638 with 100 mm/min tensile speed, as shown in FIG. 22A, FIG. 22B & FIG. 22C. As to L-series, the maximum break elongation rate achieves 387%, not related to amount of hard segment while the tensile strength is increased along with increasing of amount of hard segment and the L-55 is the best with tensile strength of 12.7 Mpa. For the D0 series (C18), both break elongation rate and tensile strength are not significantly increased. While in D1 series (C18), the maximum break elongation rate achieves 700% and the tensile strength is increased along with increasing of amount of hard segment. The tensile strength of D1-50 is 18.8 Mpa. Therefore, along with increasing of generations of dendrimer, molecular interactions such as hydrogen bonding and Van der Walls' Force are increased and the mechanical strength is also enhanced.

As to yield strength, it also increases along with increasing of the hard segment. In L-series, the yield strength increases from 8.2 Mpa to 12.4 Mpa. In D0 series (C18), it increased from 5.2 Mpa to 6.1 Mpa. In D1 series (C18), it increases from 3.7 Mpa to 4.4 Mpa. It is learned that the amount of hard segment also has influence on tensile strength.

Figure 23A:
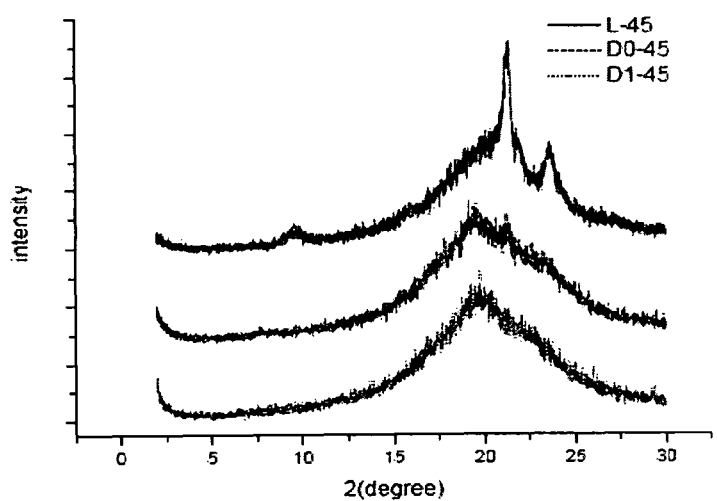
FIG. 23A shows W-XRD pattern of polyurethane with 45 wt % hard segment according to the present invention.
Figure 23B:
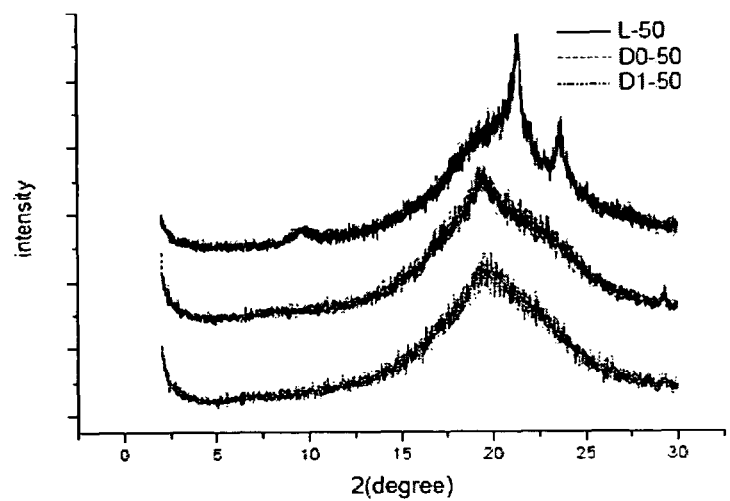
FIG. 23B shows W-XRD pattern of polyurethane with 50 wt % hard segment according to the present invention.
Figure 23C:
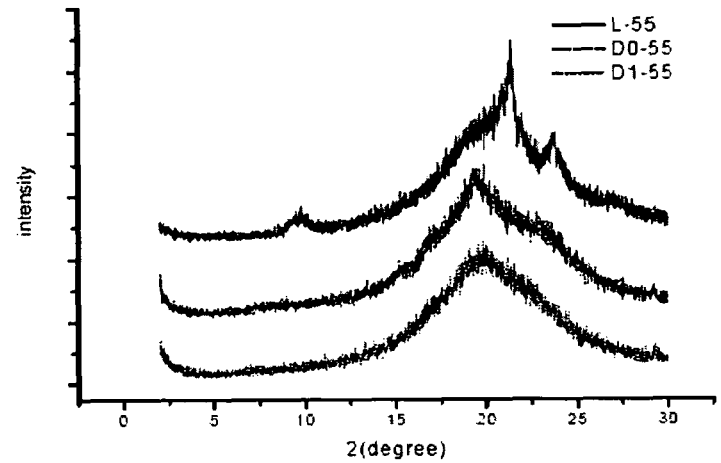
FIG. 23C shows W-XRD pattern of polyurethane with 55 wt % hard segment according to the present invention.

Study atomic structure of crystalline substances by W-XRD (x ray diffraction), refer to FIG. 23A, FIG. 23B & FIG. 23C. Compared L, D0 and D1 series with the same position of hard segment, it is found in L-series, the crystallinity of the soft segment is better when the chain extender is short-segment DEG. The characteristic peak of Polycaprolactone is observed at 9.6°, 21.4° and 23.6°. In D0 and D1 series (C18), crystallinity of Caprolactone is destructed along with introduction of dendrimer and the height of the characteristic peak is relatively smaller, turning into amorphous state. Now a bit phase-mixing is occurred due to side chain dendritic structure in the soft segment. Along with steric hindrance of side chain, crystallinity of the soft segment is reduced. Although perfect crystal lattice is not observed in D0 and D1 series (C18), the ductility and tensile strength are improved with certain degrees by introduction of dendrimer. By DSC, phase-mixing and molecular interactions such as hydrogen bonding and Van der Walls' Force induced by dentritic structure are also observed.

After introduction of dendrimer with an end group of C10 chain into the polyurethane, the mechanical properties are not improved significantly due to lack of physical crosslinking of the hard segment, and earlier degradation of hydrogen bonding as well as Van der Walls' Force. Thus the material property is poor when the soft segment is melt. The shape-memory material between melting point of the soft segment and glass transition temperature must have good stability. In order to improve mechanical properties of the dendrimer with an end group of C10 chain, chain extender of original Decyl Alcohol ($C_{10}H_{21}OH$) is replaced by Dendritic diol with an end-group of 1-Octadecanol ($C_{18}H_{37}OH$).

The present invention introduces dendrimer into polyurethane. By control amount of the hard segment, the influence of amount of the hard segment on the polyurethane is discussed. The chain extender Di(ethylene glycol) with linear structure is used as a control group so as to learn the effects of dendrimer on polyurethane.

Through ATR-FTIR and tests of mechanical properties, it is learned that the hydrogen bonding in the malonamide of dendrimer increases molecular interactions such as hydrogen bonding and Van der Walls' Force and the thermal stability as well as mechanical strength of material is significantly enhanced.

After introduction of dendrimer, the dendrimer arranges in polyurethane orderly to form hard domain of the hard segment. This lead to microscopic phase separation of soft segment and hard segment so that the recovery rate is improved. In tests of shape recovery, the recovery rate is up to 90% along with introduction of dendrimer and increasing generations of dendrimer, some even achieves 100%.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

-continued
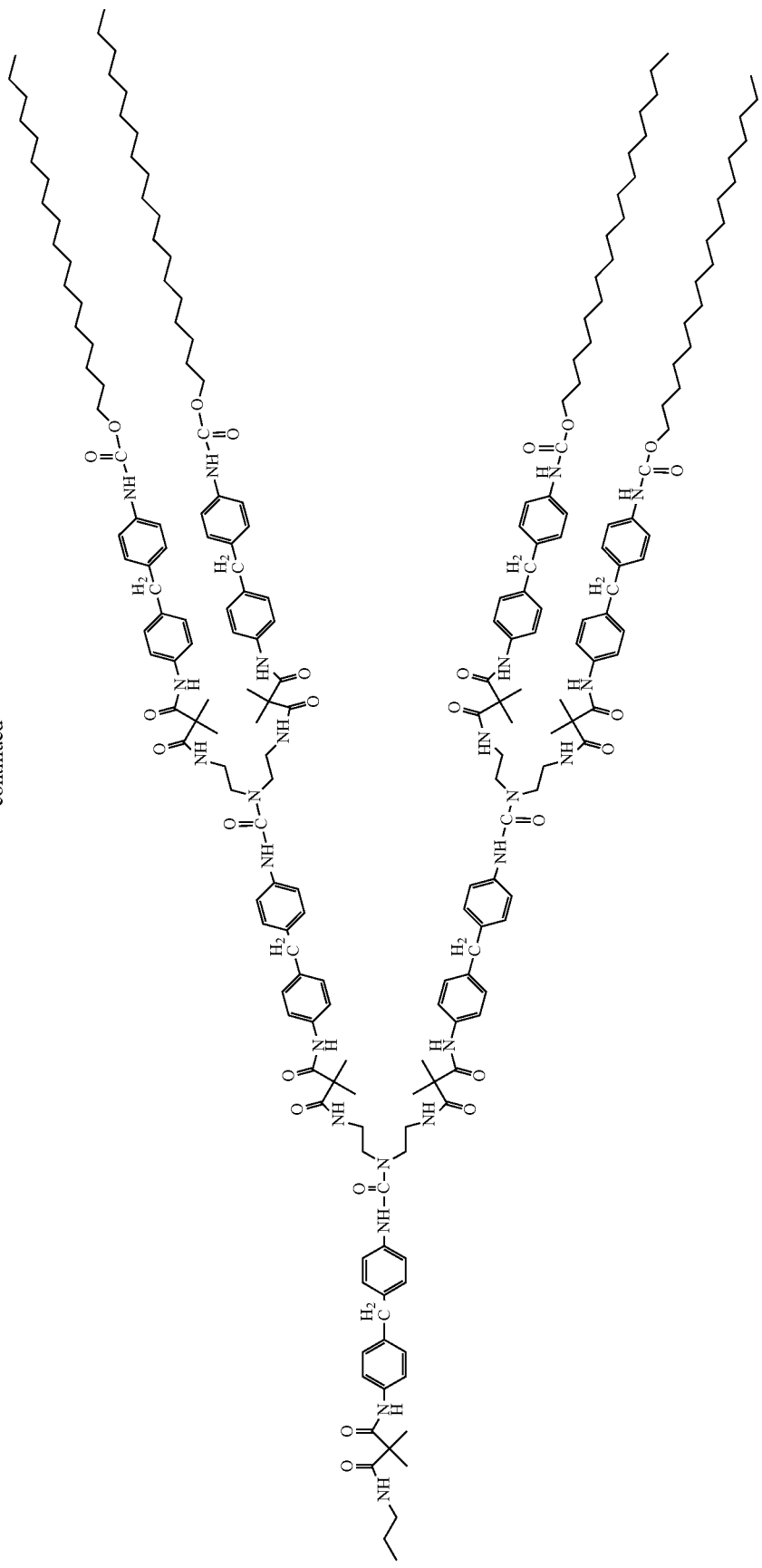

What is claimed is:

1. An organic polyurethane shape memory material comprising:

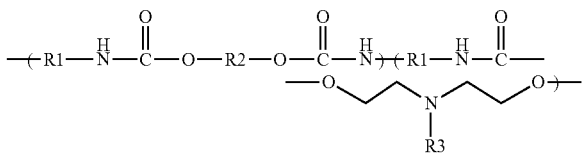

wherein R1 is ($C_{13}H_{10}$);
R2 is ($C_5H_{10}COO)_xC_2H_4OC_2H_4(OOCC_5H_{10})_y$, where $x+y=25\sim26$; and
R3 is selected from the group consisting of:

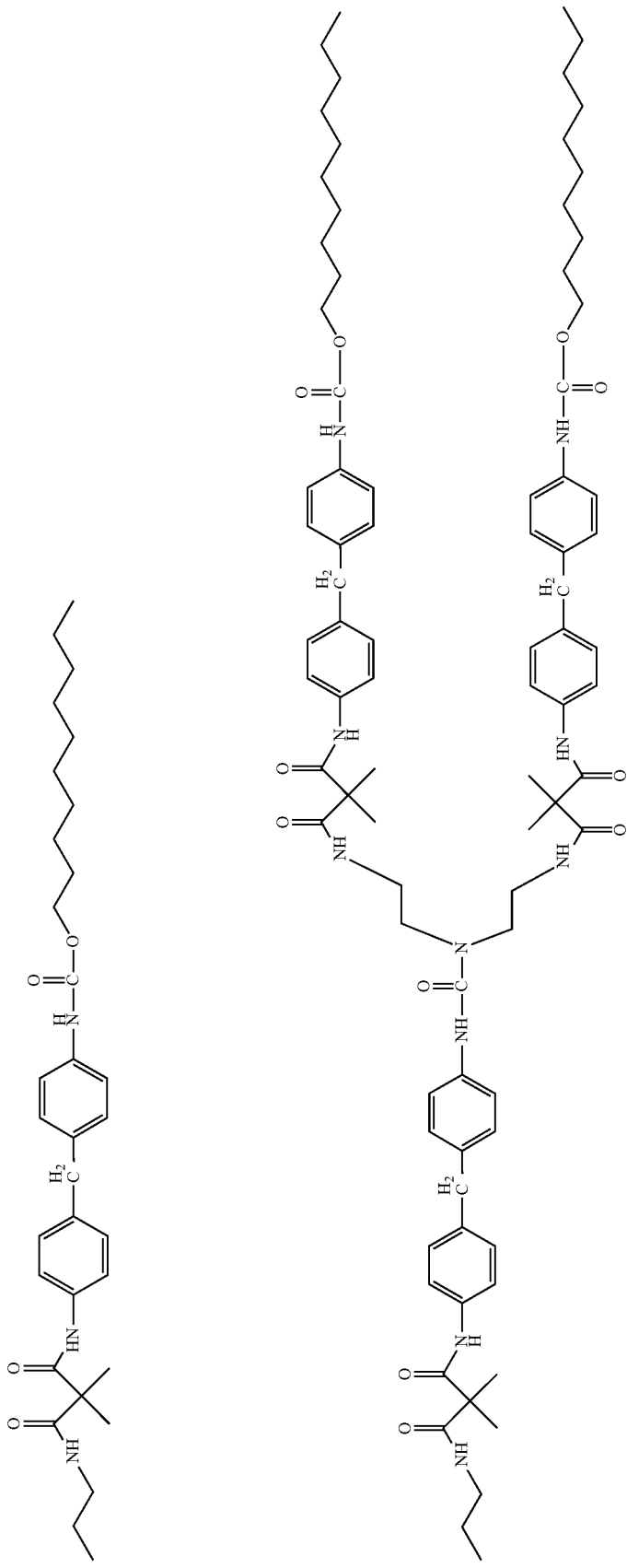

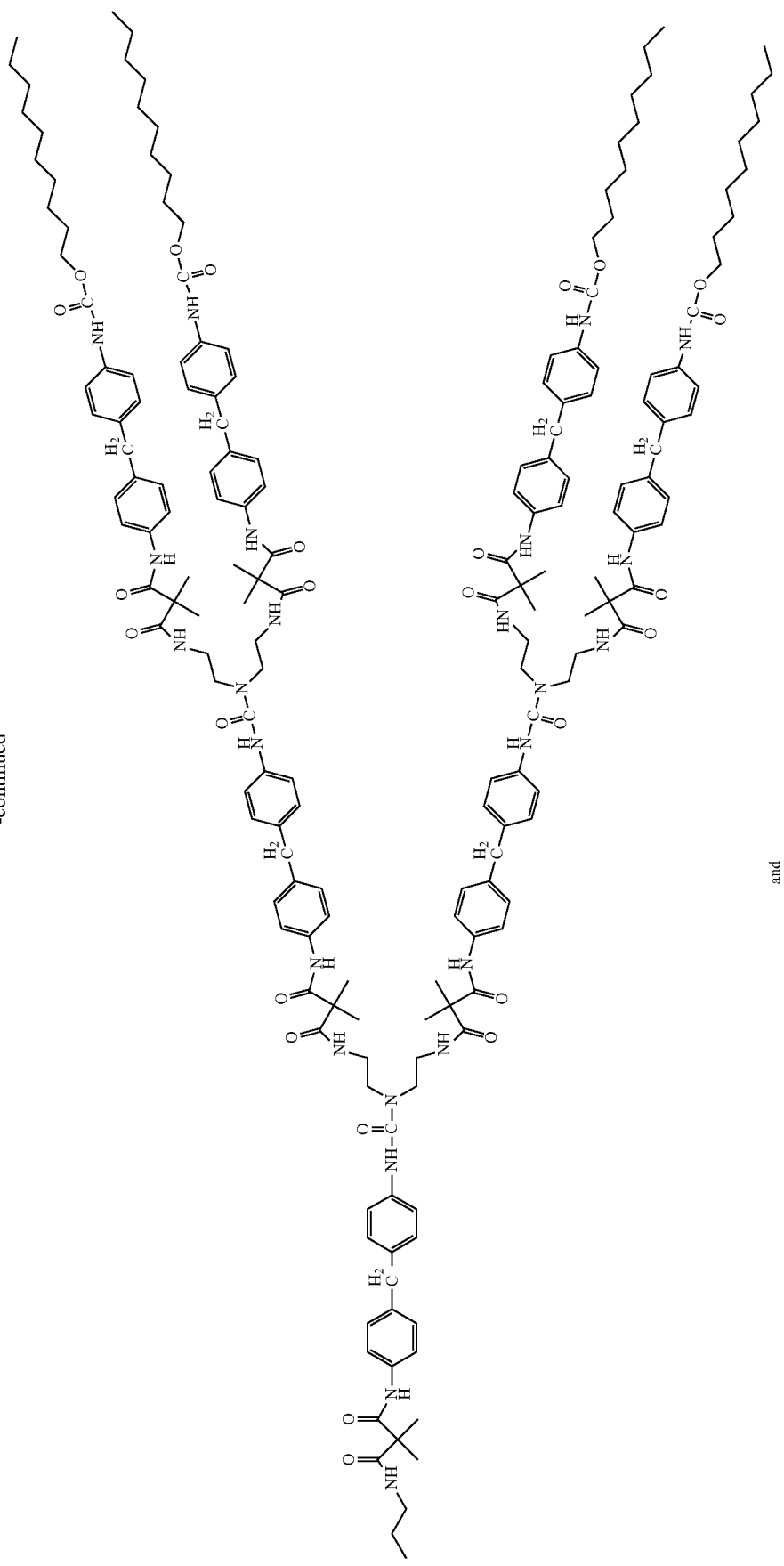
and